(12) United States Patent
Swarup

(10) Patent No.: US 10,707,985 B2
(45) Date of Patent: Jul. 7, 2020

(54) COMMUNICATION USING CHAOTIC WAVEFORMS

(71) Applicant: AshRem Technologies, Inc., Burbank, CA (US)

(72) Inventor: Ashitosh Swarup, Burbank, CA (US)

(73) Assignee: ASHREM TECHNOLOGIES, INC., Burbank, CA (US)

( * ) Notice: Subject to any disclaimer, the term of this patent is extended or adjusted under 35 U.S.C. 154(b) by 0 days.

(21) Appl. No.: 16/283,192

(22) Filed: Feb. 22, 2019

(65) Prior Publication Data

US 2019/0190638 A1    Jun. 20, 2019

Related U.S. Application Data

(63) Continuation of application No. 15/686,783, filed on Aug. 25, 2017, now Pat. No. 10,256,932, which is a continuation of application No. 15/079,913, filed on Mar. 24, 2016, now Pat. No. 9,780,902, which is a continuation-in-part of application No. 13/708,822, filed on Dec. 7, 2012, now Pat. No. 9,306,779.

(60) Provisional application No. 61/568,037, filed on Dec. 7, 2011.

(51) Int. Cl.
| | | |
|---|---|---|
| *H04B 1/69* | (2011.01) | |
| *H04B 1/707* | (2011.01) | |
| *H04B 1/713* | (2011.01) | |
| *H04J 13/00* | (2011.01) | |
| *H04L 5/00* | (2006.01) | |
| *H04L 27/00* | (2006.01) | |
| *H04L 27/18* | (2006.01) | |
| *H04J 13/10* | (2011.01) | |
| *H04L 27/227* | (2006.01) | |

(52) U.S. Cl.
CPC .......... *H04J 13/0018* (2013.01); *H04J 13/10* (2013.01); *H04L 5/0016* (2013.01); *H04L 27/001* (2013.01); *H04L 27/18* (2013.01); *H04L 27/2278* (2013.01)

(58) Field of Classification Search
CPC ........ H04J 13/0018; H04J 13/10; H04J 13/00; H04L 27/001; H04L 27/18; H04L 27/2278; H04L 5/0016; H04L 27/361
USPC ................................ 375/130, 140, 146, 343
See application file for complete search history.

(56) References Cited

U.S. PATENT DOCUMENTS 6,980,028 B1 *  12/2005  Plants .............. H03K 19/17744
                                                          326/40
2002/0136275 A1 *  9/2002  Wight ...................... H03C 3/40
                                                          375/146

\* cited by examiner

*Primary Examiner* — Phuong Phu
(74) *Attorney, Agent, or Firm* — David R. Stevens; Stevens Law Group

(57) ABSTRACT

Example communication systems and methods are described. In one implementation, a method receives a first chaotic sequence of a first temporal length, and a second chaotic sequence of a second temporal length. The method also receives a data symbol for communication to a destination. Based on the data symbol, the second chaotic sequence is temporally shifted and combined with the first chaotic sequence to generate a composite chaotic sequence. The first chaotic sequence functions as a reference chaotic sequence while the second chaotic sequence functions as a data-carrying auxiliary chaotic sequence.

18 Claims, 22 Drawing Sheets

COMMUNICATION USING CHAOTIC WAVEFORMS

RELATED APPLICATIONS

This application is a continuation, and claims priority to U.S. patent application Ser. No. 15/686,783, entitled "Communication Systems and Methods," filed on Aug. 25, 2017, the disclosure of which is incorporated by reference herein in its entirety. That application claims the priority benefit to U.S. patent application Ser. No. 15/079,913, entitled "Communication Systems and Methods," filed on Mar. 24, 2016, the disclosure of which is incorporated by reference herein in its entirety. That application claims the priority benefit of U.S. patent application Ser. No. 13/708,822, entitled "Chaotic communication systems and methods," filed Dec. 7, 2012, the disclosure of which is incorporated by reference herein in its entirety. That application claims the priority benefit of U.S. Provisional Application Ser. No. 61/568,037, entitled "Chaotic communication systems and methods," filed Dec. 7, 2011, the disclosure of which is incorporated by reference herein in its entirety.

STATEMENT REGARDING FEDERALLY-SPONSORED RESEARCH OR DEVELOPMENT

This invention was made with government support under Contract No. W15P7T-11-C-H203 awarded by the U.S. Army. The government has certain rights in the invention.

TECHNICAL FIELD

The present disclosure generally relates to communication systems and, in particular embodiments, to digital communication systems and methods using chaotic signals as modulating waveforms.

BACKGROUND

Various communication systems are available for communicating data between two locations. For example, spread-spectrum broadband digital communication systems have long offered several advantages over narrowband communication systems, including better immunity to noise, improved multipath rejection and, in the case of signals hidden in the noise floor, a low probability of intercept. Additionally, code division multiple access (CDMA) techniques allow multiple users to be supported on the same bandwidth. Typical applications of these digital communication techniques include cellular phones and the global positioning systems. However, these existing systems are often vulnerable to spoofing, jamming, and various techniques that may intercept the communicated signals.

DETAILED DESCRIPTION

Figure 1:
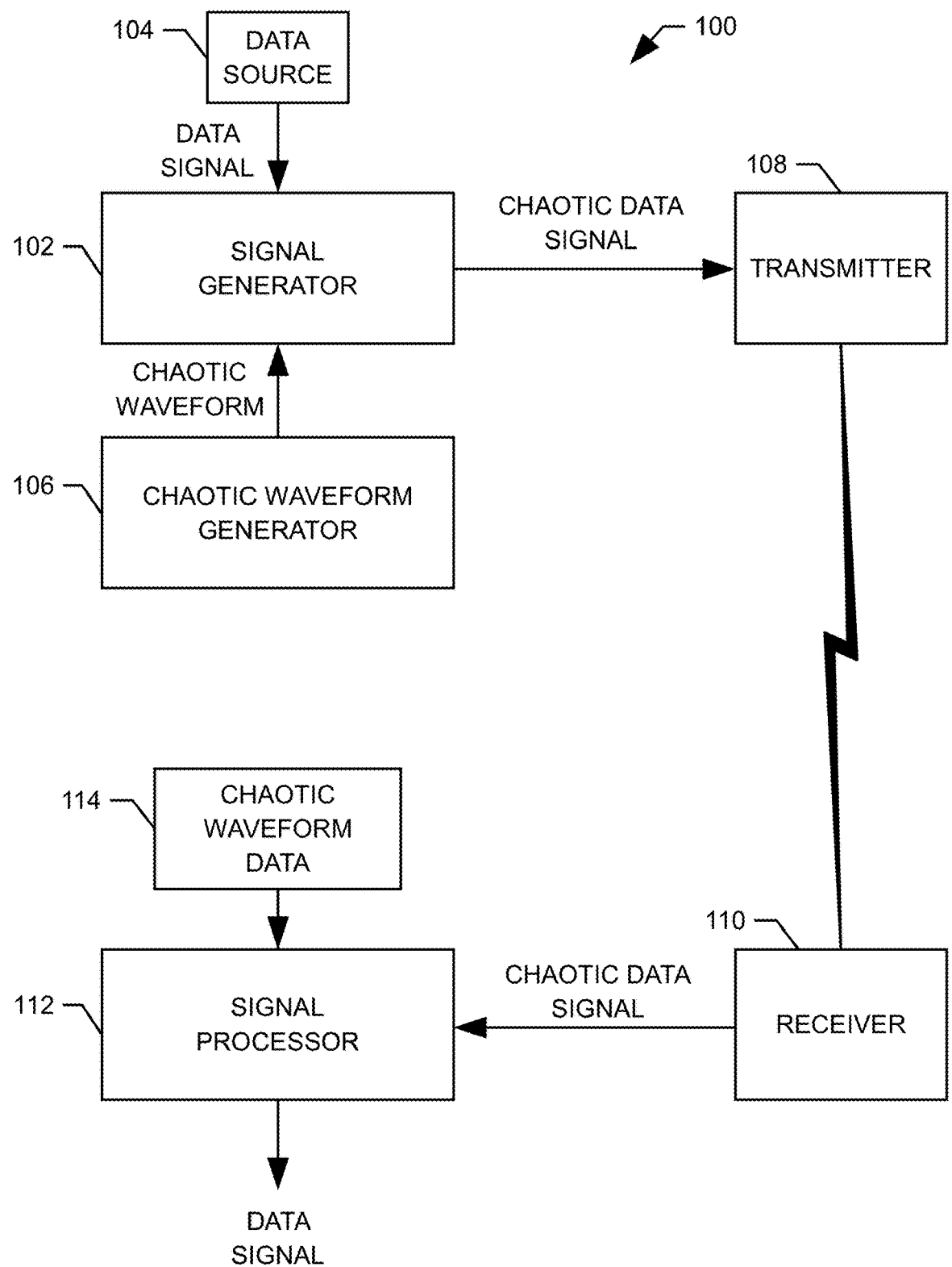
FIG. 1 illustrates an example chaotic communication system in accordance with an embodiment.

The systems and methods described herein use chaotic signals as modulating waveforms to communicate data to a destination. The chaotic signals replace, for example, conventional binary spreading codes as used in current spread-spectrum techniques. These described systems and methods use a slice of a chaotic waveform, sampling and quantizing it, and repeating it periodically. The chaotic sequence can be generated either a priori and stored in a file that can be read, or generated in real-time with a chaotic signal generator that uses, for example, the CORDIC (COordinate Rotation DIgital Computer) block in a programmable logic device, such as a FPGA (field programmable gate array).

Spread-spectrum broadband digital communication systems offer several advantages over narrowband communication systems, including better immunity to noise, improved multipath rejection and, in the case of signals hidden in the noise floor, a low probability of intercept. Further, code division multiple access (CDMA) techniques allow multiple users to be supported on the same bandwidth. Typical examples of these digital communication techniques are cellular phones and the Global Positioning System. These systems use binary spreading waveforms, and while they offer the advantages discussed above over narrowband communication systems, they still have their limitations—for example, a GPS (global positioning system) signal is vulnerable to spoofing. Further, carrier and code clock regeneration techniques take advantage of the binary modulation schemes and can be used to intercept these signals.

Example chaos-based digital communication schemes are described herein. Chaotic signals are deterministic, reproducible signals with the properties of noise. Chaotic signals are generated by nonlinear systems, either in the analog domain or digitally. These systems are very sensitive to initial conditions, with different temporal waveforms being produced by the same system with only a slight change in initial conditions. The frequency domain representation of these signals resembles noise spectra, and they display strong autocorrelation properties, with weak cross-correlations. These properties of chaotic signals make them very desirable for use in digital communication systems, since they offer several improvements over spread spectrum systems using binary modulation, such as lower probably of interception and better security.

The systems and methods described herein include one or more of the following features:

Uses a slice of a chaotic sequence that is sampled and quantized, and repeated periodically.

CORDIC block implementation of chaotic generator allows for real-time generation of chaotic sequence.

Does not need resynchronization signals to be sent periodically in case of loss of communication link.

Software-defined chaotic transmitter and receiver pair does not need specialized processing hardware.

Can be implemented using conventional clock generators; does not require a high-precision clock (e.g., GPS or atomic clocks) at either the transmitter or the receiver.

Capable of operating below the noise floor.

Secure communication system—signal or message cannot be decoded by anyone who does not have knowledge of the chaotic modulating signal.

High data rates.

Does not require or use a chaotic signal generator that runs indefinitely since the chaotic sequence is periodic.

FIG. 1 illustrates an example chaotic communication system 100, in accordance with an embodiment. As shown, a signal generator 102 receives a data signal from a data source 104, and receives a chaotic waveform from a chaotic waveform generator 106. In alternate embodiments, the chaotic waveform generator 106 is replaced with any system or device capable of providing a chaotic waveform to the signal generator 102. In some embodiments, the chaotic waveform generator 106 is a storage device that stores one or more chaotic waveforms (or portions of chaotic waveforms). The signal generator 102 generates a chaotic data signal, which includes the data signal as modulated by at least a portion of a chaotic waveform. In some embodiments, the chaotic data signal is generated by multiplying the data signal and the chaotic waveform. The chaotic data signal is provided to a transmitter 108, which transmits the chaotic data signal to a destination (e.g., a receiver 110 or other system at the destination).

The receiver 110 at the destination receives the chaotic data signal and provides the signal to a signal processor 112. The signal processor 112 extracts the data signal from the chaotic data signal based on the chaotic waveform data 114. The chaotic waveform data 114 used by the signal processor is the same as (or is a representation of) the chaotic waveform used by the signal generator 102 that generated the chaotic data signal (e.g., the chaotic waveform generated by chaotic waveform generator 106). The extracted data signal is then provided to another system or component for processing.

Figure 2:
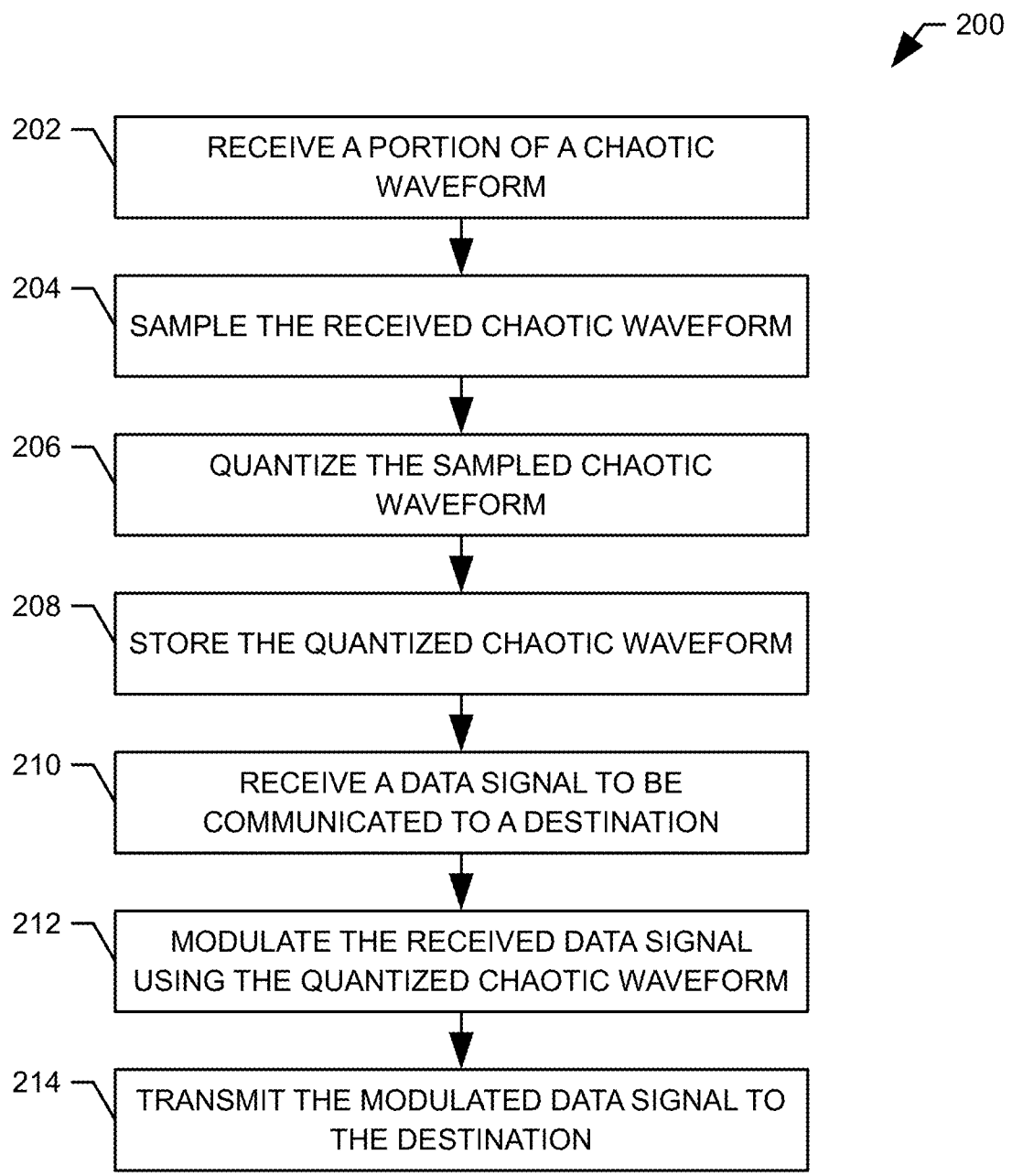
FIG. 2 is a flow diagram of a method, in accordance with an embodiment, for generating and transmitting a chaotic data signal.

FIG. 2 is a flow diagram of a method 200, in accordance with an embodiment, for generating and transmitting a chaotic data signal. The method 200 receives a portion of a chaotic waveform at 202 and samples the received chaotic waveform at 204. The sampled waveform is quantized at 206 and stored at 208 for future access by a signal generator or other component/system. Quantizing the waveform refers to the process of mapping a large set of input values to a smaller set, which is part of the waveform digitization process. This digitization process includes sampling the waveform in time and quantizing the waveform to account for the effects of the analog-to-digital converter, discussed herein. The method 200 then receives a data signal that is to be communicated to a destination (e.g., via a wireless communication link) at 210. The received data signal is modulated using the quantized chaotic waveform at 212 and the modulated data signal is transmitted to the destination at 214. Additional details regarding the generation and transmitting of chaotic data signals are provided herein.

Figure 3:
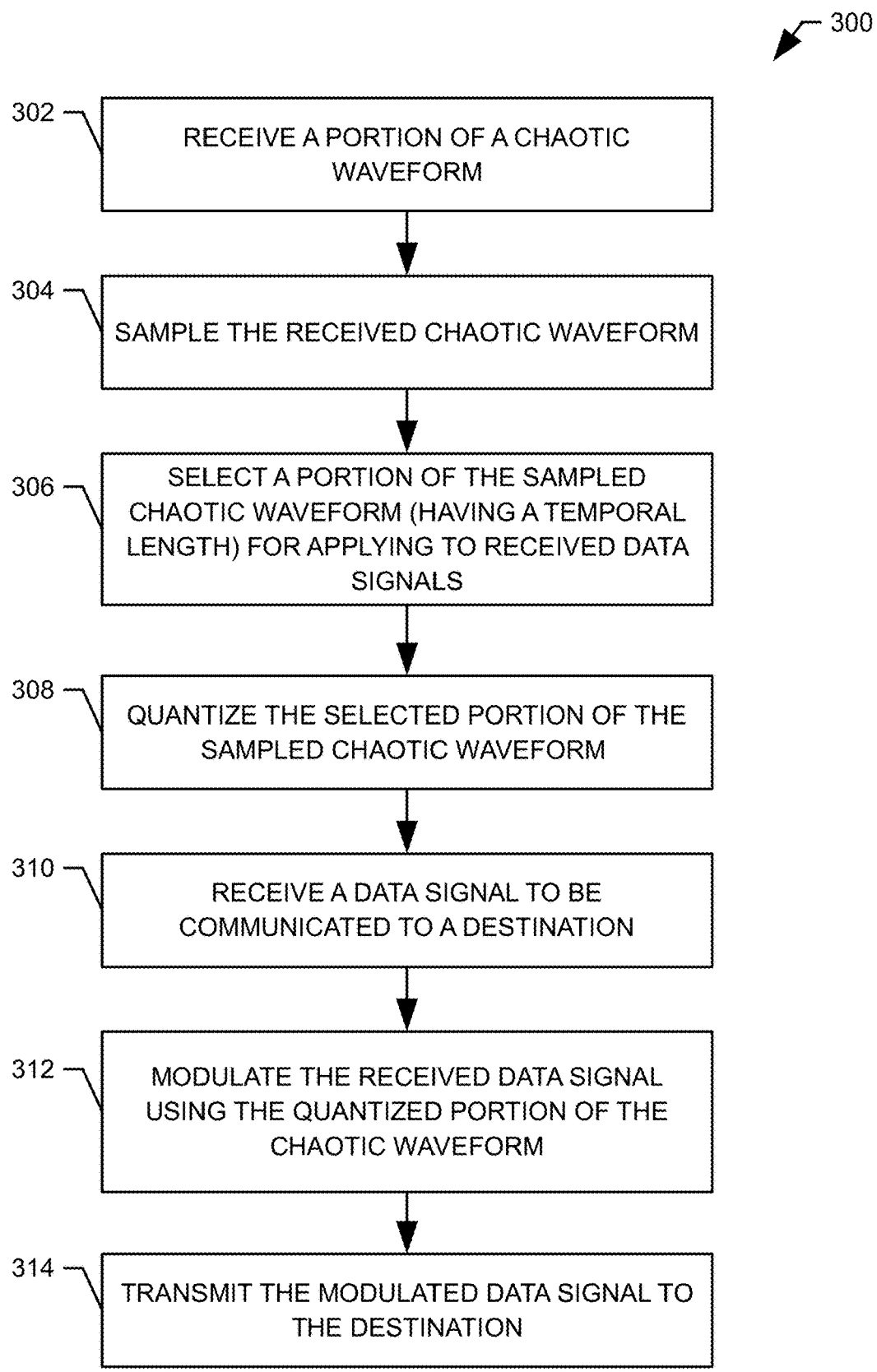
FIG. 3 is a flow diagram of another method, in accordance with an embodiment, for generating and transmitting a chaotic data signal.

FIG. 3 is a flow diagram of another method 300, in accordance with an embodiment, for generating and transmitting a chaotic data signal. The method 300 receives a portion of a chaotic waveform at 302 and samples the chaotic waveform at 304. A portion of the sampled chaotic waveform is selected at 306 for applying to received data signals. The selected portion of the sampled chaotic waveform has a temporal length (also referred to as a "periodic interval"). The method 300 continues by quantizing the selected portion of the sampled chaotic waveform at 308. The method 300 continues as a data signal is received at 310. The received data signal is to be communicated to a destination. The received data signal is modulated at 312 using the quantized portion of the chaotic waveform and the modulated data signal is transmitted to the destination at 314.

Figure 4:
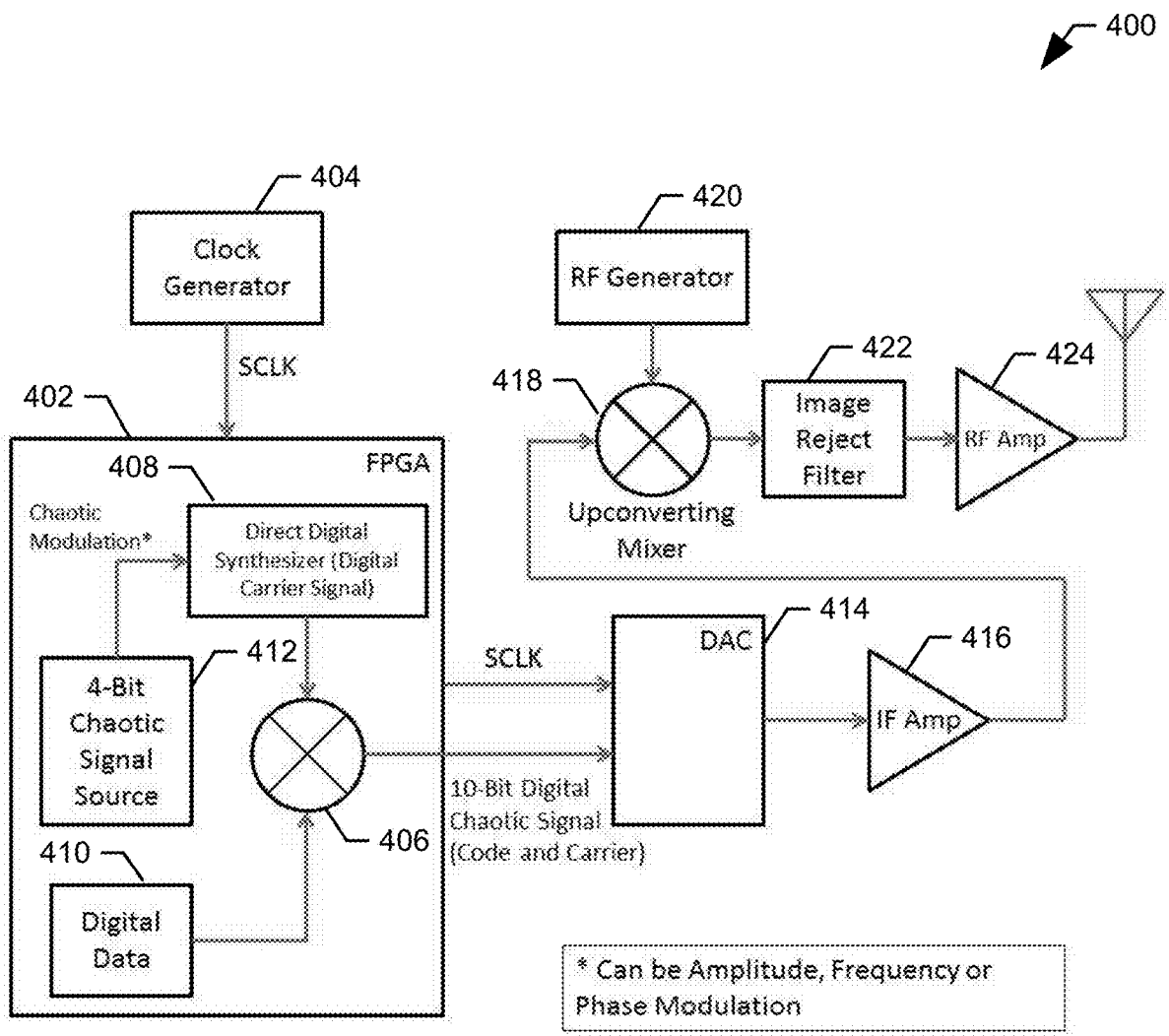
FIG. 4 is a block diagram of a chaotic signal transmitting system in accordance with an embodiment.

FIG. 4 is a block diagram of a chaotic signal transmitting system 400 in accordance with an embodiment. In the embodiment of FIG. 4, a FPGA 402 is coupled to a clock generator 404 that provides a clock signal to the FPGA 402. The FPGA 402 includes a digital multiplier 406 that receives signals from a direct digital synthesizer 408 and a digital data source 410. The FPGA 402 also includes a 4-bit chaotic signal source 412 that provides a chaotic signal to the direct digital synthesizer 408 to account for various modulation schemes, such as amplitude modulation, frequency modulation, and phase modulation. The output of digital multiplier 406 is a 10-bit digital chaotic signal including a code and a carrier. The 10-bit digital chaotic signal is provided to a DAC (digital-to-analog converter) 414. Additionally, the FPGA 402 communicates the clock signal received from the clock generator 404 to the DAC 414. The DAC 414 communicates the converted signal to an IF (intermediate frequency) amplifier 416, which communicates the amplified signal to an upconverting mixer 418. The upconverting mixer 418 receives a signal from an RF (radio frequency) generator 420. The output of the mixer 418 is communicated to an image reject filter 422. The output of image reject filter 422 is communicated to an RF amplifier 424, which amplifies the upconverted chaotic signal to provide the necessary signal power prior to RF transmission to a destination device.

An example implementation of the chaotic signal transmitting system 400 communicates wirelessly in the L-band (950-1950 MHz). In this example implementation, the clock generator 404 generates a master clock signal for the chaotic signal transmitting system 400. This master clock signal has a frequency of 52.0833 MHz. The FPGA 402 is the source of the digital chaotic signal. The 4-bit chaotic signal source 412 produces a digitized chaotic signal that clocks at one fourth the master clock rate (i.e., the clock signal generated by the clock generator 404). At a rate of four master clock samples per chaotic sequence sample, the resultant chaotic signal sequence rate is 13.028 MHz. Also, the chaotic sequence repeats every 125 samples, and assuming that the digital data modulates the chaotic signal at the repeat rate, this gives a resultant data rate of 104.167 kbps.

In the example implementation of chaotic amplitude modulation, the direct digital synthesizer generates an 8-bit wide digital carrier sine wave that multiplies the chaotic signal (chaotic amplitude modulation). The digital carrier sine wave has a frequency of 15 MHz. This signal upconverts the spectrum of the chaotic signal, and reduces the high-pass effects of the digital-to-analog converter on the chaotic signal, which is sampled and held. If the chaotic signal is directly input to the DAC, then the lower frequencies get distorted since the output of the DAC is transformer-coupled. This results in a nonlinear transient response in the flat portions of the chaotic signal. Upconverting the signal in the digital domain itself minimizes the effect of the DAC on the low frequency components of the signal. The output composite code-carrier digital data is 10-bit. However, the multiplication of the code and carrier gives a 12-bit number. This 12-bit number has its lower 2 bits truncated to give a 10-bit output. This procedure is performed to increase the fidelity of the multiplication process.

The digital data from the data source 410 is a stream of ones and zeroes. If the value of the data bit is one, then the 10-bit digital chaotic signal is not modified. However, if the value of the data bit is zero, then the 10-bit digital chaotic code-carrier signal is multiplied by −1.

In the example implementation, the DAC 414 is a 10-bit, 100 MSPS capable device. The DAC 414 receives as input the system clock of 52.0833 MHz and the 10-bit digital chaotic signal described above. The IF amplifier 416 conditions the signal output by the DAC 414 to drive the upconverting mixer 418. The RF generator 420 outputs a frequency of 1.9375 GHz to the upconverting mixer 418. The upconverting mixer 418 receives the output analog chaotic signal from the DAC 414 which is centered at a 15 MHz analog frequency and mixes it with the 1937.5 MHz sinusoidal signal from the RF generator 420 to produce two versions of the chaotic signal—the first is a high-side upconvert, giving an output frequency of 1922.5 MHz and the second is the low-side upconvert frequency of 1952.5 GHz. Both versions of the chaotic signal are provided to image reject filter 422. The image reject filter 422 is a passive filter that suppresses the higher image frequency and passes the desired upconverted signal to an antenna, which transmits the upconverted chaotic signal in the L-band.

Figure 5:
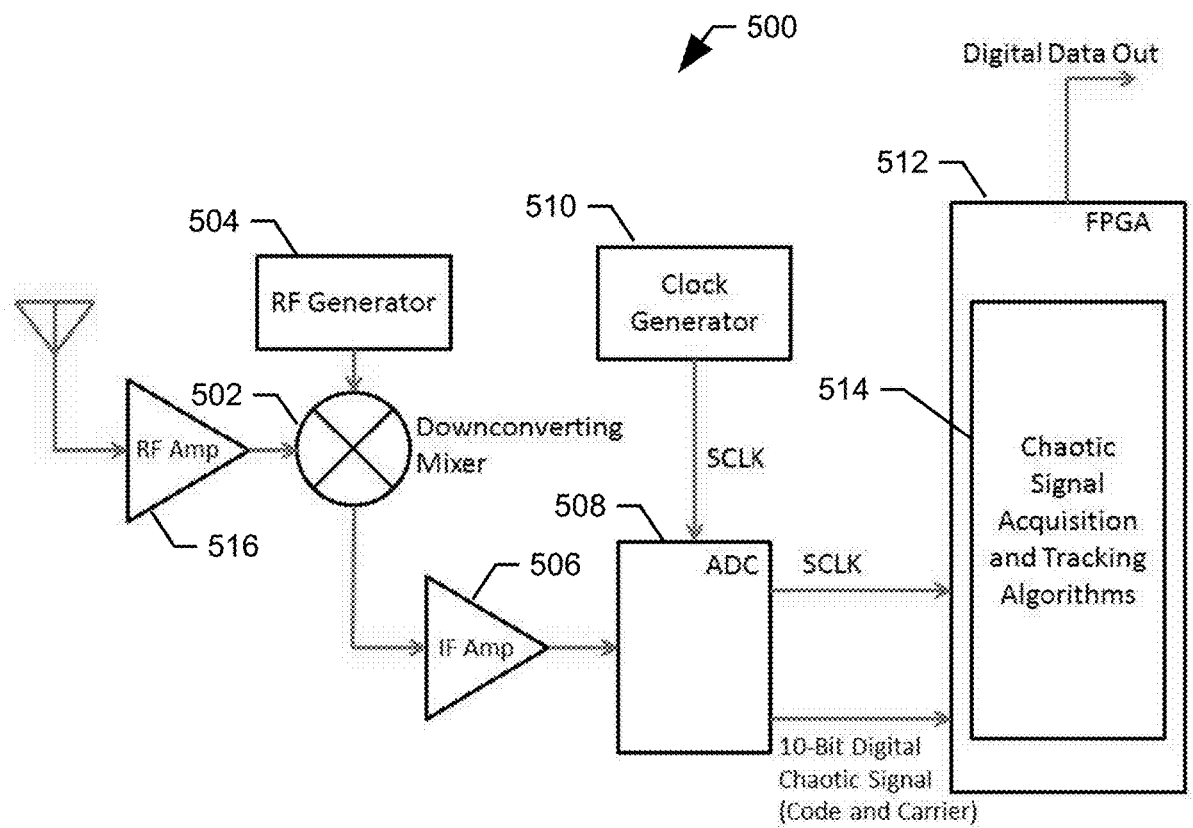
FIG. 5 is a block diagram of a chaotic signal receiving system in accordance with an embodiment.

FIG. 5 is a block diagram of a chaotic signal receiving system 500 in accordance with an embodiment. In the embodiment of FIG. 5, an RF amplifier 516 receives a chaotic signal from an antenna and amplifies the chaotic signal in the RF band prior to downconversion. A downconverting mixer 502 receives the amplified signal from the RF amplifier and receives an RF signal from an RF generator 504. The downconverting mixer 502 is coupled to an IF amplifier 506, which is coupled to an ADC (analog-to-digital converter) 508. The ADC 508 receives a master clock signal from a clock generator 510. Two output signals are provided from the ADC 508 to a FPGA 512: the master clock signal (generated by the clock generator 510) and a 10-bit digital chaotic signal. The FPGA 512 includes one or more chaotic signal acquisition and tracking algorithms 514 that extract a digital data signal from the 10-bit digital chaotic signal.

An example implementation of the chaotic signal receiving system 500 communicates wirelessly in the L-band (950-1950 MHz). In this example implementation, the RF generator 504 drives one of the two inputs of the downconverting mixer 502, which is used to mix the input RF signal at 1922.5 MHz with the locally generated 1731.25 MHz signal to get a downconverted baseband center frequency of 191.25 MHz. The IF amplifier 506 provides the necessary amplification to the downconverted signal in order to drive the ADC 508. The clock generator 510 generates the master clock for the chaotic signal receiving system 500. In this particular example, the master clock has a frequency of 52.0833 MHz, which is the same as the chaotic signal transmitting system 400 discussed above.

The ADC 508 is used to digitize the chaotic signal at baseband for digital processing by the FPGA 512. The ADC outputs the 52.0833 MHz clock along with the 10-bit digitized chaotic data to the FPGA 512. The FPGA 512 executes the acquisition and tracking algorithms in real-time, and demodulates the chaotic signal to generate the digital data output.

The design of the chaotic digital communication system is based on a chaotic spreading sequence that is generated by an a priori generated data file that is programmed into the FPGA itself. The discrete-time chaotic function used in some embodiments is based on the cubic map, given by the discrete-time recursive equation:

$$x_{k+1} = 4x_k^3 - 3x_k, \quad (1)$$

where different initial conditions $x_0$ give different chaotic time ensembles, where $|x_0| < 1$. An alternative to the algebraic equation (1) is to represent this cubic map by a trigonometric equation, where, by substituting:

$$x_n = \cos \phi_n, \quad (2)$$

and then applying the triple angle formula, the result is:

$$x_{n+1} = \cos \phi_{n+1} = 4 \cos^3 \phi_n - 3 \cos \phi_n = \cos 3\phi_n. \quad (3)$$

Then, the equation for the cubic map can be expressed by the following trigonometric equation:

$$\cos \phi_{n+1} = \cos 3\phi_n, \quad (4)$$

which can be written as a recursion based on an initial value of $\phi$ at $n=0$ as:

$$\cos \phi_n = \cos 3^n \phi_0. \quad (5)$$

Thus, the sequence $\{\cos \phi_n\} = \{\cos 3^n \phi_0\}$, for some $\phi_0$ forms the basis for a discrete-time trigonometric chaotic sequence generator. Further, by changing the multiplier on the angle from 3 to other values such as 5, 7 and so on gives additional functions (maps) that can be used to generate chaotic time sequences in discrete-time. These properties of trigonometric chaotic generating functions are used as the basis for the fixed-point chaotic sequence generating algorithm discussed below Fixed-Point Discrete-Time Chaotic Sequence Generator Using the CORDIC Block From a computational perspective, the equations discussed above that are used to generate the chaotic time series use floating-point arithmetic to perform the computations. One embodiment of the discrete-time chaotic generator using floating point processing is accomplished by using an embedded processor on an FPGA. In alternate embodiments, the trigonometric chaotic generating function can be modified to work in a fixed-point (FPGA) environment, using the CORDIC block.

Figure 6:
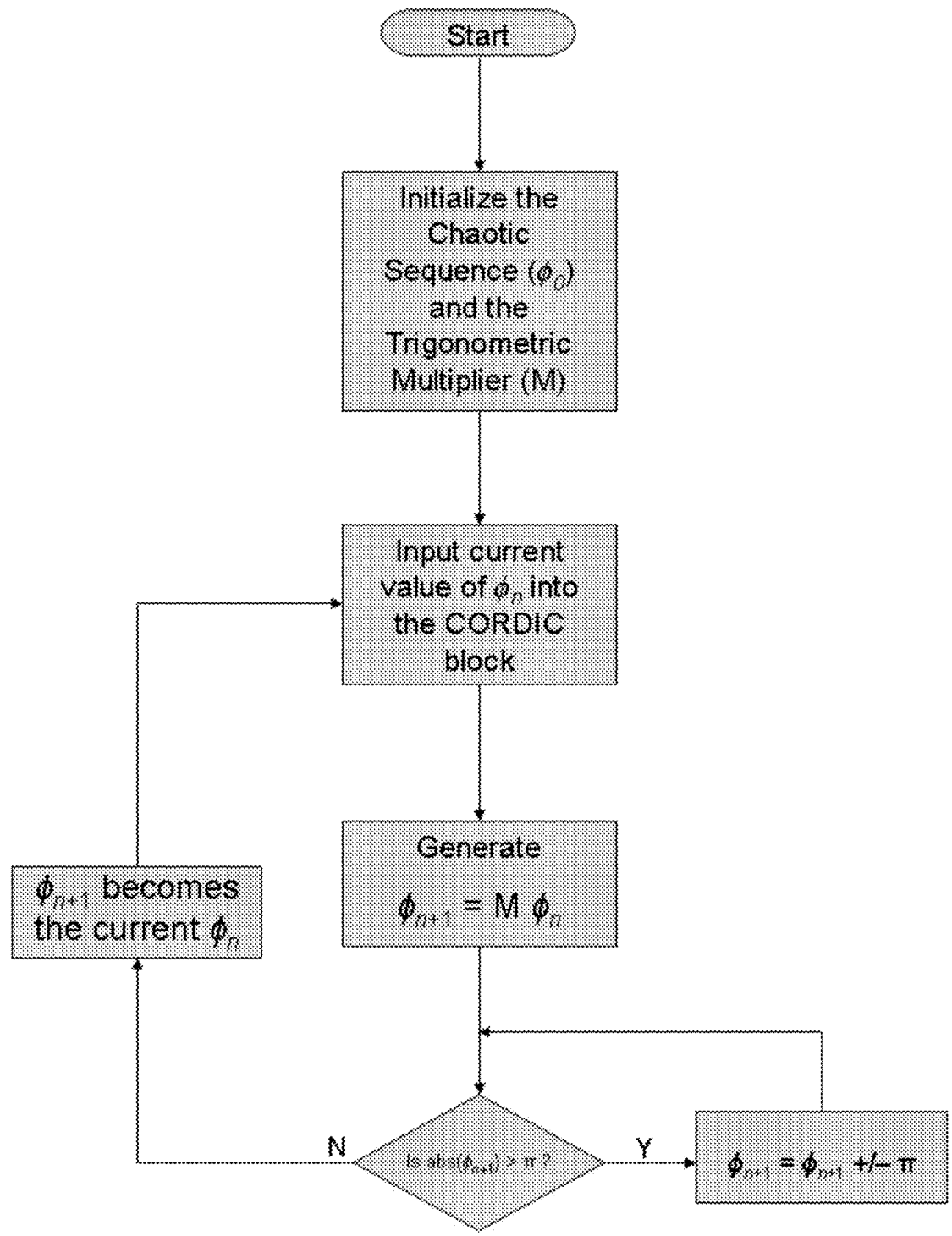
FIG. 6 is a flow diagram of a method, in accordance with an embodiment, for generating a chaotic sequence in fixed-point arithmetic using a CORDIC block.

In some embodiments, computation is performed in fixed point; the input angle as well as the output cosine function are in FixN_Q format. In order to generate the chaotic sequence, there are two parameters chosen: an initial condition and a trigonometric multiplier (equal to 3 for the cubic map). Then, at each iteration, the initial condition is recursively multiplied by the trigonometric multiplying factor which is then input to the CORDIC block. The time series output of the CORDIC block is the discrete-time chaotic sequence. By clocking the CORDIC block at a fraction of the master system clock (e.g., at a quarter rate), the sample-and-hold algorithm can be implemented, yielding the CDSS-SH (Chaotic Direct-sequence Spread Spectrum-Sample and Hold) chaotic sequence, which takes advantage of the early-late-prompt discriminator function in order to implement the chaotic code tracking loop. While implementing the chaotic sequence generator in fixed-point, the recursive multiplication by the trigonometric multiplier results in the value of the input to the CORDIC block growing with time. This can be a problem for both fixed and floating point implementations. In order to work around this, the input angle is constrained to be in the interval $(-\pi, \pi)$, and if the angle increases or decreases to a value that lies outside this interval, the value of $\pi$ in the appropriate FixN_Q format is subtracted or added from the angle (depending on the sign) until the angle lies within the required interval. FIG. 6 is a flow diagram of this example method for generating a chaotic sequence in fixed-point arithmetic using a CORDIC block.

The systems and methods discussed herein generate discrete-time chaotic signals using fixed-point representation in devices such as FPGAs. The advantage of generating chaotic sequences in this manner allows for greater flexibility as compared to the generation of such sequences based on text files that are loaded into the FPGA at program time. Also, it is possible that the fixed-point arithmetic implementation of these chaotic sequence generators will be faster and less complex than the corresponding implementations in floating-point arithmetic. The dyad formed by the initial phase angle and the trigonometric multiplier as initialization variables can also allow for the reconfiguration and reprogramming of such chaotic generators in the field, and also allow for "rolling codes" that allow the chaotic sequence generator to be reinitialized with a new code each time the system is turned on. This allows for greater security and immunity from eavesdropping. Increasing the bit resolution on both the input and the output of the chaotic generation block allows for greater cipher strength and reduced probability of interception and detection, while also giving a larger ensemble of signals that can be generated using this technique. Due to the finite-precision offered by the fixed-point format, the number of points that can be generated by such chaotic generators is ultimately limited, and the chaotic sequences can exhibit periodicities. The same is true for sequences generated using floating point processing, only that the time period of the corresponding orbits are much longer. For finite-length chaotic slices used as spreading sequences this is not a limitation, as different uncorrelated slices from the same chaotic sequence can be used for different receivers. Similarly, different trigonometric configurations of the CORDIC block in the FPGA (i.e., sine and tangent function generators) can be used to generate discrete-time chaotic sequences.

Example Chaotic Digital High-Speed Data Communication System

Certain systems and methods described herein use a single chaotic spreading code sequence that is sampled and quantized. This slice of chaotic code is periodically repeated on a continuous basis, and the digital data to be transmitted modulates the sign of the chaotic spreading sequence. This system, originally configured to transmit digital data at a rate of 125 kbps, is currently configured to transmit data at a rate of 694 kbps. The technique used to increase the data rate, i.e. by reducing the number of samples per code chip along with decreasing the length of the integrate-and-dump sequence (thereby decreasing the repetition period of the chaotic sequence slice), is limited in the fact that the spreading sequence length cannot be arbitrarily decreased to a small value without severely compromising the security features of the system while also greatly increasing the probability of data bit errors. Although a sample rate increase can be used to increase the data rate, there is also an upper limit to how much the sample rate can be increased while keeping practical considerations like system size, power consumption and weight in mind.

In order to work around these shortcomings, the following technique is presented that allows for an increase in the data rate while maintaining a reasonable limit on system resources. This technique involves the use of two coexistent chaotic code spreading sequences. The first is a pilot code sequence, which is acquired and tracked in a conventional manner. The data modulation technique, i.e. BPSK, can be introduced on this pilot code sequence, which allows it to carry additional information. The second coexisting code sequence is one out of a bank of N distinct chaotic code sequences. In the simplest realization of the system, each sequence out of this bank is mapped to a binary symbol (which translates to a binary data word of appropriate length), and depending on the input data word, the appropriate code sequence (referred to herein as the auxiliary chaotic code sequence) is selected and transmitted along with the pilot chaotic code sequence. At the receiver, a standard set of code and carrier tracking loops decode and track the pilot code sequence. At the same time, a complete set of replica sequences that are the same as the auxiliary code sequences are simultaneously integrated-and-dumped with the input signal, and the signal with the largest integrate-and-dump value corresponds to the transmitted auxiliary code sequence. The successful detection of this auxiliary code sequence allows the receiver to appropriately select the corresponding binary data word for output. Additional variations in this technique further allow for the increase in the data rate, as discussed herein. This data communication technique is referred to herein as Chaotic Code Multiplexing (ChCM).

Figure 7:
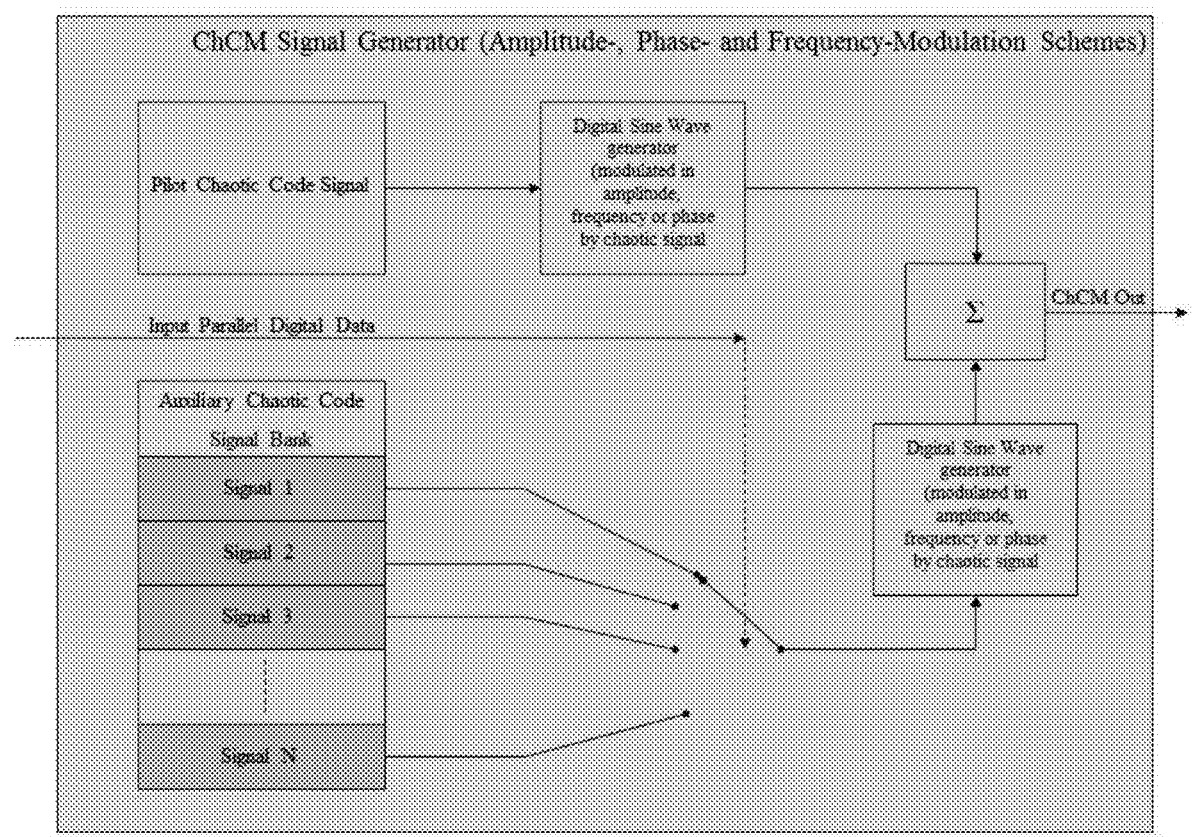
FIG. 7 is a block diagram of a ChCM (Chaotic Code Multiplexing) signal generator in accordance with an embodiment.

The basic ChCM signal is constructed using the correlation properties of chaotic signals. These signals have strong autocorrelation properties and weak cross-correlations. Thus, it is possible for multiple chaotic signals to coexist on the same bandwidth with minimum interference with each other. The ChCM signal is derived as a summation of two signals: a pilot chaotic code signal and an auxiliary chaotic code signal selected from a bank of N distinct candidate signals. Each signal can be independently correlated with its replica at the receiver with minimal interference. In some embodiments, both signals are slices of chaotic signals of equal length and repetition period. The pilot chaotic code is thus a fixed signal that does not change, while the auxiliary chaotic code is variable and depends on the input digital data word. FIG. 7 illustrates an example of a block diagram of a ChCM signal generator.

The pilot chaotic code signal as well as the multiplexed auxiliary chaotic signals in the respective bank are shown in FIG. 7. In a particular example, there are N auxiliary chaotic signals in the bank, where N, for convenience, is selected to be a power of 2, such as:

$$N=2^M, \quad (6)$$

where M is an integer number. Now, from binary arithmetic, this bank of N signals can uniquely support the entire number set represented by the M-bit wide binary word. In other words, each auxiliary chaotic sequence is mapped to a M-bit binary symbol. For example, if N=32, then the complete number set corresponding to 5-bit binary words can be completely represented by this set of N codes: signal 1 represents the binary word 00000, signal 2 represents the binary word 00001, and so on, until the signal 32 represents the binary word 11111. If the basic data rate supported by the basic system that uses only the pilot chaotic code sequence is D, then the ChCM system allows for a net data rate of MD. For example, for a 125 kbps system, using a 32-signal bank increases the data rate by a factor of 5, to 625 kbps. Using larger banks of distinct chaotic signals will allow further multiplicative increases in data rates.

Figure 8:
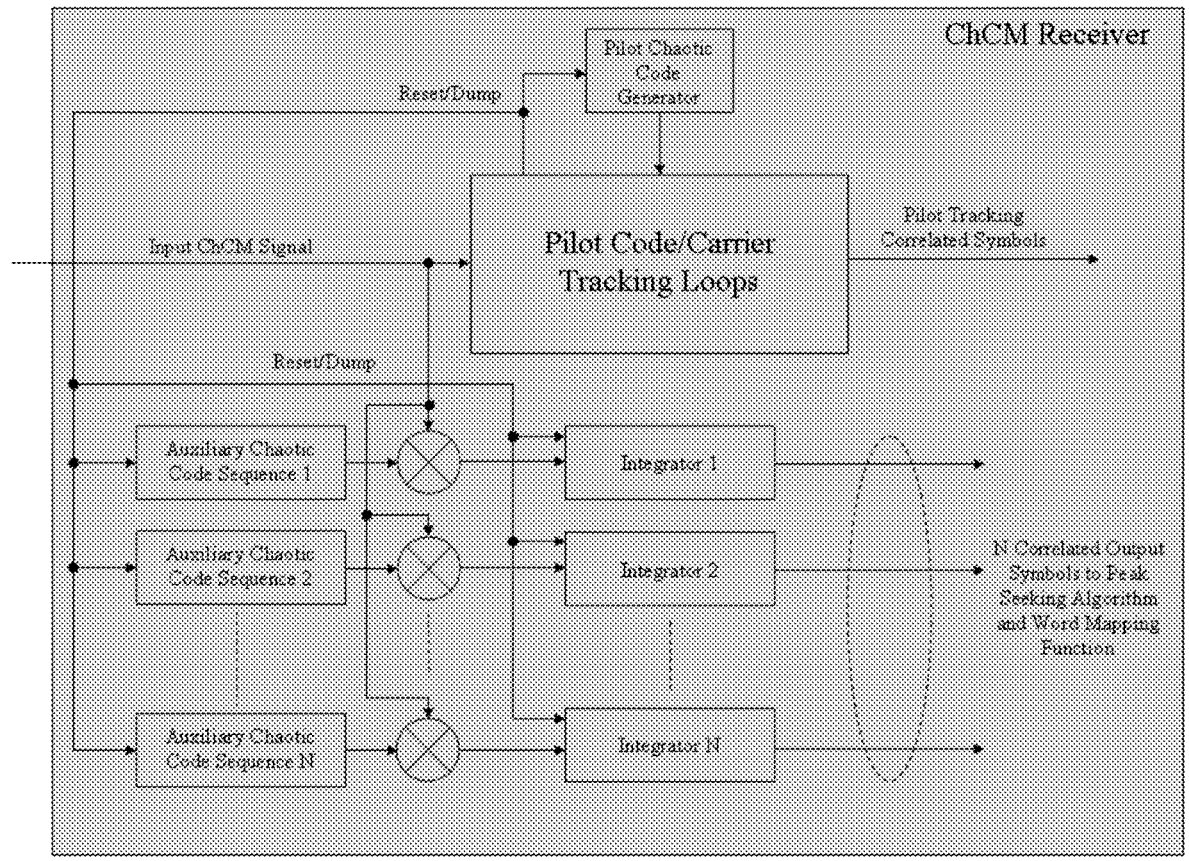
FIG. 8 illustrates an example of the code tracking portion of a ChCM receiver in accordance with an embodiment.

FIG. 8 illustrates an example of the code tracking portion of a ChCM receiver in accordance with an embodiment. The ChCM receiver of FIG. 8 is derived from the basic CDSS (Chaotic Direct-sequence Spread Spectrum) receiver. The basic acquisition and code/carrier tracking loops function in the same way for the pilot chaotic code sequence. Once acquisition is complete and the locally generated pilot code is synchronized with the incoming signal, a second set of N parallel integrate-and-dump loops simultaneously correlate the input signal with each of the signals in the auxiliary chaotic signal bank. The output of the N integrate-and-dump blocks are evaluated at the end of every integrate-and-dump interval. Due to the correlation properties of chaotic signals and the fact that the transmitted chaotic signals are phase-aligned and have the same time-period, only the auxiliary chaotic signal that is present in the received waveform will produce a large value at the output of the respective integrate-and-dump block, while other blocks will show small values. Thus, a peak-seeking algorithm can be used to determine which output is the maximum, and upon finding the maximum peak in the output sequence, the corresponding M-bit binary word can be mapped to the output.

Modified ChCM Communication System for Higher Data Rates

Figure 9:
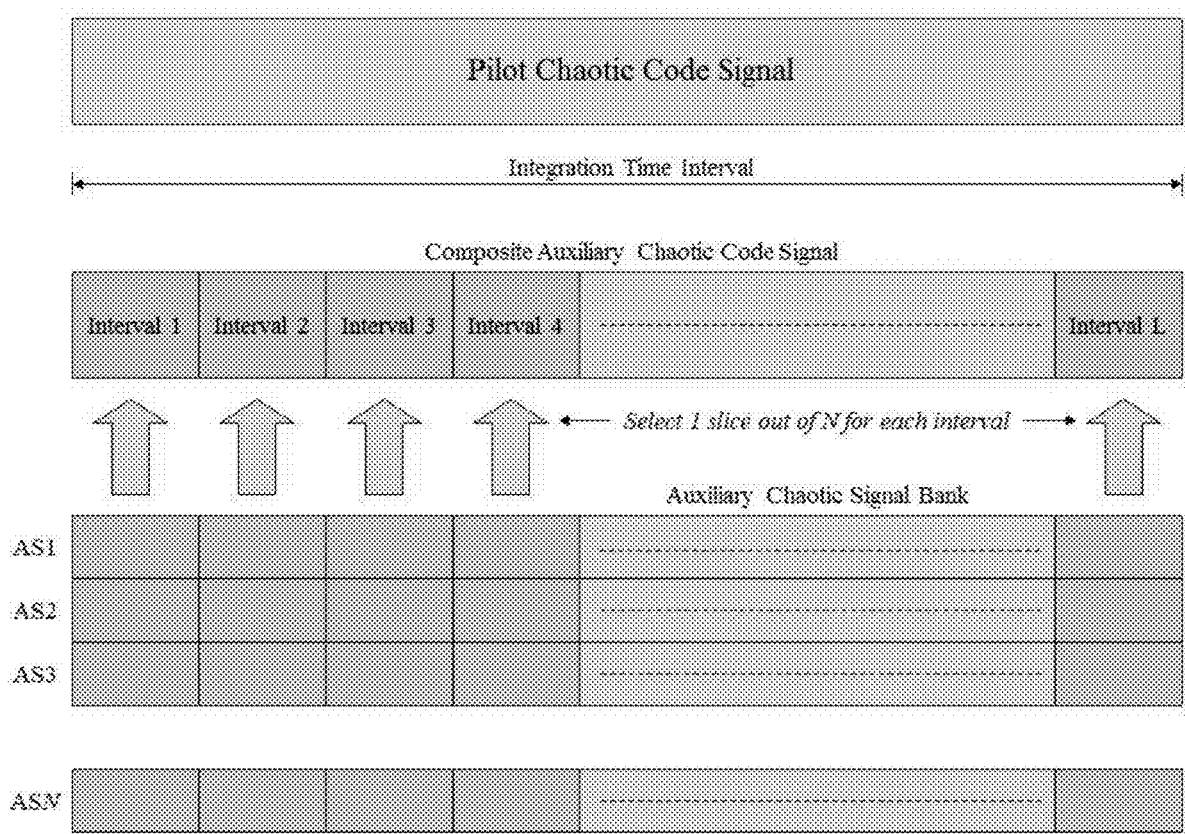
FIG. 9 is a signal composition diagram for a modified ChCM system in accordance with an embodiment.

FIG. 9 is a signal composition diagram for a modified ChCM system in accordance with an embodiment. The following embodiment allows for higher data rates from the ChCM system without needing a large number of auxiliary code sequences. This enhancement utilizes the temporal characteristics of chaotic signals to design a modified transmitter/receiver structure as described below.

The modified ChCM signal structure is still based on the combination of multiplexed auxiliary code signals and a pilot chaotic code sequence. The pilot chaotic code sequence in this modified design is unchanged from the basic system—it is the multiplexing of the auxiliary chaotic signals that is modified. In this embodiment, the time period of the pilot signal (which is also the time period for the integrate-and-dump routine) is divided into L equal partitions. During the time interval corresponding to each partition, a slice of any one of the N auxiliary code sequences is inserted into the output stream, and the combination of slices inserted into the output stream depends on the input binary word. Thus, in each of the L intervals, there are N possible code slices that can be inserted, giving a total of $N^L$ combinations of output auxiliary chaotic code sequences. As before, if N is a power of 2, then from equation (6), the widest binary word that can be supported by the system has a width $$W=\log_2(N^L)=L\log_2(2^M)=LM. \quad (7)$$

Thus, the division of the interval into L intervals increases the data rate of the basic ChCM system described above by a factor of L.

In a particular example, let N=2 (i.e. two auxiliary chaotic code sequences) and let L=5. For the simplest ChCM system, two symbols can be transmitted using this example: either a 1 or a 0, for an equivalent word width of 1 bit (i.e., M=1). If L=5 intervals are introduced and in each interval, then it is seen that in each interval, there are two possibilities—either a slice of the auxiliary chaotic signal 1 is introduced or a slice of the auxiliary chaotic signal 2 is introduced. For five intervals, the total number of combinations are 2*2*2*2*2=32 possibilities, giving a word width of $\log_2 2^5=5$ bits=LM. This auxiliary signal that is composed of a combination of slices of independent auxiliary chaotic sequences is combined with the pilot signal and transmitted.

Figure 10:
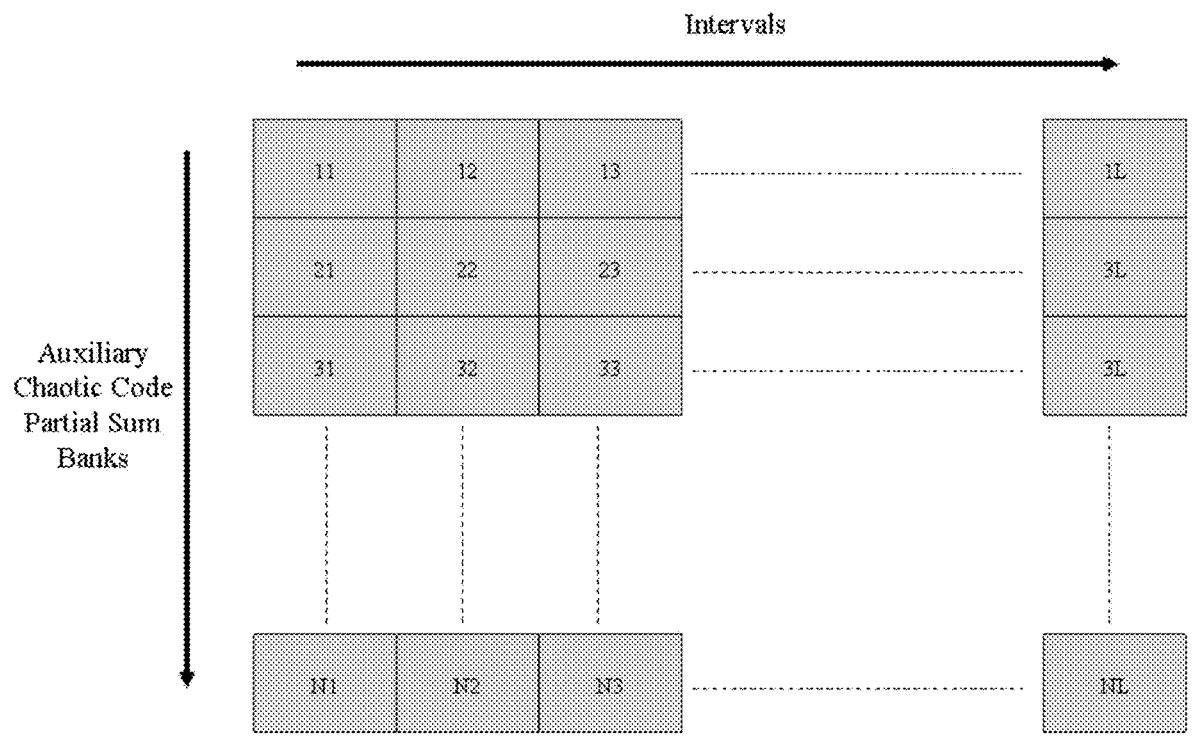
FIG. 10 illustrates an example matrix showing ChCM intervals and partial sums in accordance with an embodiment.

The complexities introduced into the modified ChCM signal structure are also reflected in the receiver. However, the resulting system is less complex for a given bit rate than the simplest ChCM receiver design, which would require a larger number of auxiliary chaotic code sequences. The basic structure of the ChCM receiver remains the same, with the same bank of auxiliary chaotic code sequences. As before, the pilot chaotic code sequence is independently tracked by a separate set of tracking loops, while the input chaotic signal is pointwise multiplied by each of the auxiliary chaotic signals from the signal bank. The main difference between the two systems is in the way the integrate-and-dump values are processed. After every time interval T/L, where T is the period of the pilot and the auxiliary code signals, the values of each of the integrators (partial sum) is stored in a separate register, and the integrators are reset. Although the integrators are reset, the chaotic code generators are not reset, and are allowed to run until the end of the interval T. At the end of each interval T, there are LN registers containing partial correlations of the input signal with slices of length T/L of all the auxiliary codes. By grouping the partial sums from the integrators from the same time interval into a separate bank, there are L banks of partial sums as shown in a matrix form in FIG. 10. If the dyad ij denotes the cells in FIG. 10, then i corresponds to the partial sum corresponding to the $i^{th}$ auxiliary chaotic code sequence, and j corresponds to the $j^{th}$ interval. Using different combinations of these partial sums provides different correlation values. Specifically, different combinations of L entries from this matrix are taken, one from each column, exhausting all possible combinations for all N auxiliary chaotic code sequences. Examples of different possible combinations for a case with four intervals and two auxiliary chaotic code sequences are:

(11, 12, 13, 14),
(11, 12, 13, 24),
(11, 12, 13, 34),
(21, 32, 43, 14), and so on. Each combination of four values is added together to give a correlation value. If the sequence of partial sums matches the code sequence on the received auxiliary chaotic code signal, then that correlation value will be the maximum value. In this example, if the received auxiliary chaotic code signal corresponds to the sequence (11, 12, 13, 14), then maximum correlation occurs for the corresponding locally generated code, and the described systems and methods detect the presence of this sequence.

Although a peak-seeking algorithm will be able to determine the maximum peak, the described systems and methods consider the fact that there will also be smaller peaks corresponding to partial correlations. Thus, for the above received sequence, the partial sum sequence, such as (11, 12, 13, 24), at the receiver will also produce a value that is approximately 75% of the peak value. On the other hand, a sequence such as (21, 22, 23, 34) at the receiver will produce a very small (i.e., uncorrelated) value.

Modified ChCM Receiver Algorithm

As discussed above, at the end of each full integrate-and-dump routine, all different combinations of partial sums based on selections from each column are to be added. For N auxiliary chaotic code sequences and L intervals, there are N possible selections from each column, which gives NL combinations of sums (of L values each) that are to be implemented. One technique is to "brute force" implement all such additions. An alternate technique, discussed below, reduces the number of additions required by the algorithm. This alternate algorithm reduces the sums of length L into smaller summations computed on-the-fly as the partial sums from the integrate-and-dump routine are computed. For example, consider a simple example with N=2 and L=3. To compute all possible relevant combinations of partial sums without optimization, it would require 8 addition combinations in total, each of 3 elements, giving a total of 16 addition operations. To optimize the computation of the correlation peak, it is noted that the total integration routine is composed of three smaller integrations. The first integration routine provides two partial sums, referred to as $S_{11}$ and $S_{12}$. Similarly, the second integration routine provides two more partial sums, referred to as $S_{21}$ and $S_{22}$. These sums are combined in the following manner to get the following sums:

$S_{111}=S_{11}+S_{21}$, $S_{112}=S_{11}+S_{22}$, $S_{211}=S_{21}+S_{12}$, $S_{212}=S_{21}+S_{22}$.

These four sums are further combined with the results from the third integration routine, $S_{31}$ and $S_{32}$, in the following manner:

$S_{1111}=S_{111}+S_{31}$, $S_{1112}=S_{111}+S_{32}$, $S_{1121}=S_{112}+S_{31}$, $S_{1122}=S_{112}+S_{32}$, $S_{2111}=S_{211}+S_{31}$, $S_{2112}=S_{211}+S_{32}$, $S_{2211}=S_{212}+S_{31}$, $S_{2212}=S_{212}+S_{32}$.

Figure 11:
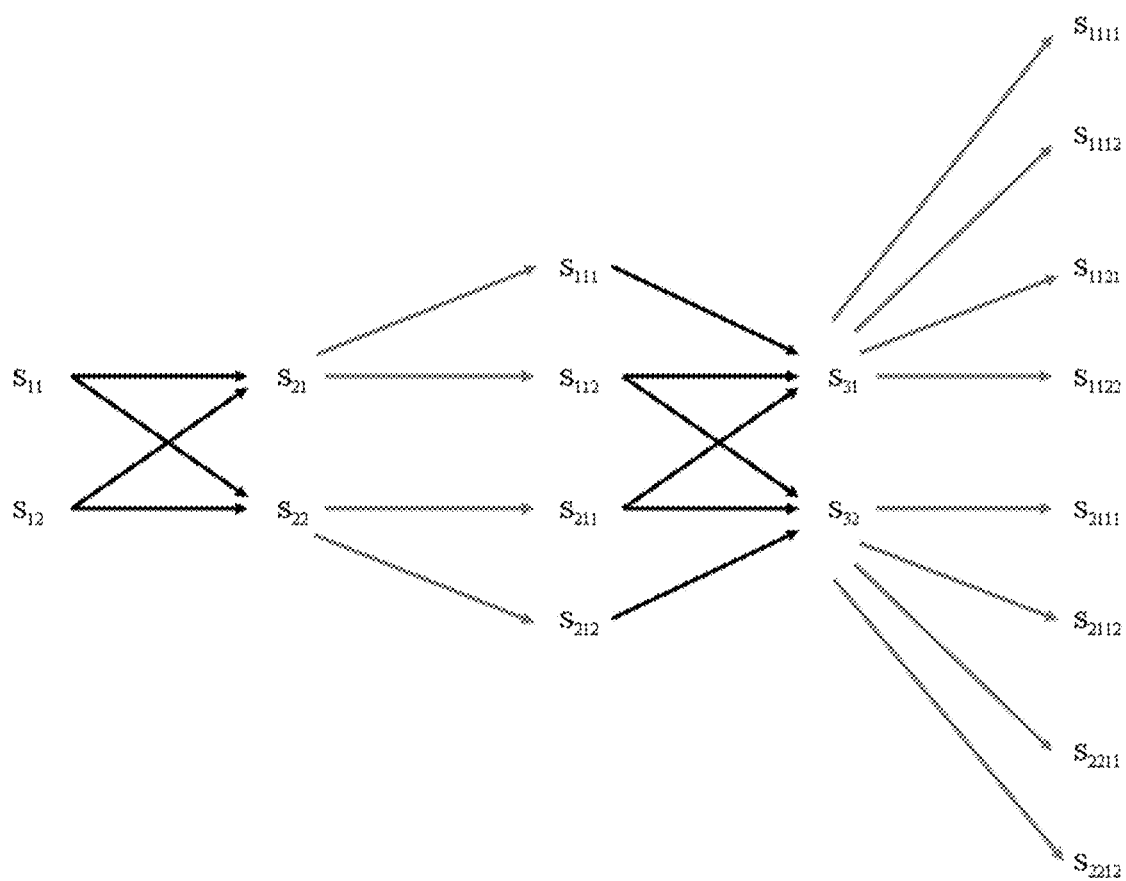
FIG. 11 illustrates an example addition algorithm used in a modified ChCM system in accordance with an embodiment.

The eight signals computed above are then evaluated by the peak-seeking algorithm, and the largest-valued signal is taken as the corresponding chaotic sequence in the received chaotic signal. If intermediate values are computed continuously, the total number of additions are reduced. In this case, only 12 addition operations are necessary, reduced from 16 operations as discussed above. More complex signal structures (i.e., larger values of N and L) will allow for a greater reduction in the number of adders required, thereby resulting in reduced system complexity. Additionally, the breaking down of the single addition operations in the non-optimized algorithm into several cascaded addition operations does not introduce latency into the system. In the former case, all additions are computed at the end of the main integrate-and-dump routine, while in the latter case, the additions are computed continuously, culminating at the end of the main integration routine. Thus, both processes end at the same time, with the former process being a one-step process at the end of the main integration routine and the latter process being a continuous flow through the main integration routine. FIG. 11 illustrates the above-described example addition algorithm used in a modified ChCM system. The example of FIG. 11 shows a total of 12 addition operations.

Additional Enhancements to the ChCM Algorithm

In some embodiments, additional enhancements are made to the ChCM algorithm that help increase the data rate while introducing different levels of complexity into the system. A few example enhancements are discussed below.

BPSK Enhancement

In some chaotic digital communication systems, a BPSK (binary phase-shift keying) data stream is used to modulate the sign of the chaotic signal. At the receiver, the polarity of the correlated symbol gives the value of the data bit (1 or 0). Similarly, in the modified ChCM algorithm, BPSK modulation can be added on both the pilot chaotic code signal as well as the auxiliary chaotic code signals. The decoding of the data bit on the pilot chaotic code is done using a standard method for chaotic demodulation. In the case of the auxiliary chaotic signal, the partial sums are computed and recombined as before. The only additional steps required before invoking the peak seeking routine are: 1) determine the sign of the correlated symbol (positive or negative), and 2) compute the absolute value of all the correlations whose values are negative. Then, when the sequence with the largest correlation is computed based on the absolute (positive) values of all the sequences, the sign of that sequence computed in step (1) adds an additional bit to the width of the binary output word. Thus, introducing BPSK modulation to the pilot and auxiliary chaotic codes allows for an addition of a total of two more bits to the binary word width, with a minimal increase in system complexity.

Generalized Code Slice Insertion Modification

In the enhanced ChCM system discussed herein (e.g., FIG. 9), the slice of code inserted into a particular time interval was selected from a particular bank of signals. Thus, as shown FIG. 9, the chaotic slice for the $i^{th}$ interval is selected only from the $i^{th}$ column in the auxiliary signal bank. This algorithm can be generalized further by allowing the insertion of a chaotic slice from any column into any interval. This allows increasing the number of code sequence combinations from $N^L$ to $(NL)^L$. Once again, if $N=2^M$, then the width of the binary word is $\log_2((2^M L)^L)=L \log_2 L+ML$. For convenience, set $L=2^K$, so that the expression for the binary word width is equal to $L(K+M)$, where L is left in its original form as a multiplication factor. In this way, the bit rate can be increased further, with the tradeoff being an increase in system complexity. The transmitter will have to have a modified architecture to insert the chaotic sequences from different intervals into a current interval, while the receiver will have to run more parallel integrate-and-dump routines to account for the selection of additional sequences present in each interval.

Using Multiple Auxiliary Chaotic Code Sequences

Another way to increase the data rate of the ChCM system is to use more than one auxiliary chaotic code sequence simultaneously along with the pilot chaotic code sequence. In other words, the pilot chaotic code sequence is transmitted along with two or more auxiliary chaotic code sequences. Then, if there are N auxiliary chaotic code sequences in the bank, out of which n auxiliary chaotic code sequences are transmitted at each time, then even without the multiple interval partitioning, this gives $C^N_n$ combinations of auxiliary chaotic code sequences, where $$C^N_n = N!/(N-n)!n!$$

For example, if there are four auxiliary chaotic code sequences (N=4), and two sequences are transmitted at one time, this gives 12 possible combinations of binary words. At the receiver, the two maximum signal peaks are selected, which is mapped to the appropriate binary word. By increasing the number of auxiliary chaotic code sequences that are simultaneously transmitted, the effective binary word width can be increased. There is, however, an upper limit to how many chaotic code sequences can be simultaneously accommodated in a given bandwidth, since, after a certain point, the chaotic code sequences start interfering with one another if the number of coexisting code sequences is high.

The techniques of multiple intervals discussed above can also be amalgamated with this technique of multiple chaotic code sequences to achieve further increases in the effective bit width. For example, consider the simplest case of L intervals where each interval is filled by n slices of chaotic signals from the same column in FIG. 9 (n<N). In this example, each interval can be filled in $C^N_n$ ways, and for L intervals, producing $(C^N_n)^L$ possible combinations, with L $\log_2(C^N_n)$ as the effective binary word width. The receiver architecture in this example is a modification of the architecture described previously, tailored to detect multiple correlation peaks.

Spread spectrum signals have the property that they can be used for the design of digital communication systems even when the spread spectrum signal is completely overwhelmed by noise. By carefully designing the spread spectrum signal integration interval, it is possible to recover a spread spectrum signal in extremely low signal-to-noise ratio environments. These systems have their limitations, however. For example, it is difficult to integrate beyond a certain time limit, due to the possibility of a digital data bit transition. This limitation is not seen with chaotic signals, as discussed below.

By way of example, consider a spread spectrum communication system that uses a binary spreading sequence that takes values of ±1. Assume that in the digital domain, there are N samples per integration period. Further, assume that the digital data is BPSK modulated, then it is well-known that such a system cannot integrate beyond N samples. If the signal-to-noise ratio degrades sufficiently, then integration up to N samples might not be sufficient to extract the spread-spectrum signal from the noise floor, which results in a loss of the communication link.

Chaotic communication systems circumvent this problem by being able to track in extremely low signal-to-noise environments by arbitrarily increasing the integration time. While the BPSK digital data is lost in this process, ChCM techniques can be used to encode digital data into the communication link. For example, consider a chaotic signal at the output of the ADC at a chaotic signal receiver:

$$s_{c_k} = d_{i_N} c_k \sin(\omega k)$$

where $d_{i_N} = \pm 1$ is the binary digital data that is held constant during each integration interval of length N, $\omega$ is the digitized carrier angular frequency, $c_k$ is the chaotic spreading sequence, and k is the discrete-time index. (Note that if binary spreading sequences were used instead of chaotic spreading sequences, then the system would use $c_k=\pm 1$.) For the chaotic communication signal described above, suppose the signal-to-noise ratio drops drastically, to the point where a single integrate-and-dump period, N, is insufficient to acquire and track. Under normal circumstances, the system would break down, rendering the communication link fractured. Further, the integration time can typically not be increased beyond N in the presence of the binary data bit for this class of systems (including binary spread-spectrum systems). In other words, integrating beyond a single bit interval is not an option for contemporary spread-spectrum systems, since the correlation peak will not be consistent due to the potential change in the polarity of the data bit $d_{i_N}=\pm 1$.

As a salient feature of chaotic and non-binary communication systems, consider an approach to square the signal $s_{c_k}$ as follows:

$$s_{c_k}^2 = c_k^2 \sin^2(\omega k)$$

where the system considers the fact that $d_{i_N}^2=1$. Now, the system can correlate this signal with a second sequence derived from the original chaotic sequence defined by:

$$\sigma_k \triangleq c_k^2$$

and thus:

$$s_{c_k}^2 = \frac{\sigma_k}{2}(1 - \cos(2\omega k))$$

Now that the binary data bit has been stripped off, the signal can be filtered to remove the low frequency chaotic component, and the system can attempt to acquire and track the composite chaotic signal:

$$\rho_k = \frac{\sigma_k}{2}\cos(2\omega k)$$

with arbitrarily long correlation lengths, using the newly defined sequence $$\left\{\frac{\sigma_k}{2}\right\}$$

at twice the original carrier frequency. Thus, if the signal-to-noise ratio drops (for example, if a broadband jammer is active), then instead of abandoning the communication link, the integration length can be increased to get a stronger correlation peak by switching to the newly defined signal $\rho_k$ as defined above by (possibly digitally) squaring the received downconverted signal, and tracking can be continued, albeit at a much lower data rate. This is a "fail-safe" mode, where the system is still robust to noise and jamming. Data can still be sent and received at this lower rate, and the communication link is still active. For example, ChCM can now be used in this situation to send data across the link via a nonstandard protocol. When the signal-to-noise ratio improves, the system can go back to its regular mode of operation. In the fail-safe mode, squaring the input signal also squares the noise signal as well, and even longer integration lengths might be required to maintain correlations, but the preservation of the communication link is still possible. This represents a significant advantage of chaotic and non-binary spreading sequences over existing BPSK spreading sequences—the sequence $\rho_k$ cannot be constructed if binary spreading sequences are used, since the squaring of the signal strips off the binary spreading sequence.

These described systems and methods, coupled with the ChCM technique, can be used to transmit data even in severely degraded signal-to-noise environments. Alternatively, a system can be designed from the ground-up to take advantage of this property, operating below the noise floor in a covert manner as a secure, undetectable communication channel.

Particular examples discussed herein are related to chaotic waveforms. However, the systems and methods described herein are applicable to other types of spread spectrum waveforms, such as binary spread spectrum waveforms. Additionally, the systems and methods discussed above are related to chaotic amplitude modulation. In other embodiments, these systems and methods are applicable to chaotic frequency modulation and chaotic phase modulation, as discussed below.

In the example of chaotic phase modulation, the phase of the chaotic signal is modulated, as given by the following equation:

$$C_{PM_k} \triangleq \sin(\omega k + c_k + \phi)$$

The phase-modulated signal ($C_{PM}$) typically possesses better spectral characteristics as compared to an amplitude modulated signal. The receiver design for the phase-modulated signal uses a spread-spectrum receiver design methodology. In some embodiments, at the expense of a slightly poorer tracking signal-to-noise ratio, for the same chaotic waveform, the corresponding amplitude-modulated chaotic receiver can demodulate and decode the phase-modulated signal.

In other embodiments, a frequency-modulated chaotic signal is generated by directly modulating the frequency of a sinusoidal carrier. The modulation equation for the frequency-modulated chaotic frequency-hopping spread-spectrum (CFSS) signal is given by the following equation:

$$C_{FM_k} \triangleq \sin[(\omega + c_k)k + \phi]$$

In this embodiment, the receiver design for the frequency-modulated signal uses a spread-spectrum receiver design methodology to demodulate and decode the chaotic frequency-hopping spread-spectrum signal.

Figure 12:
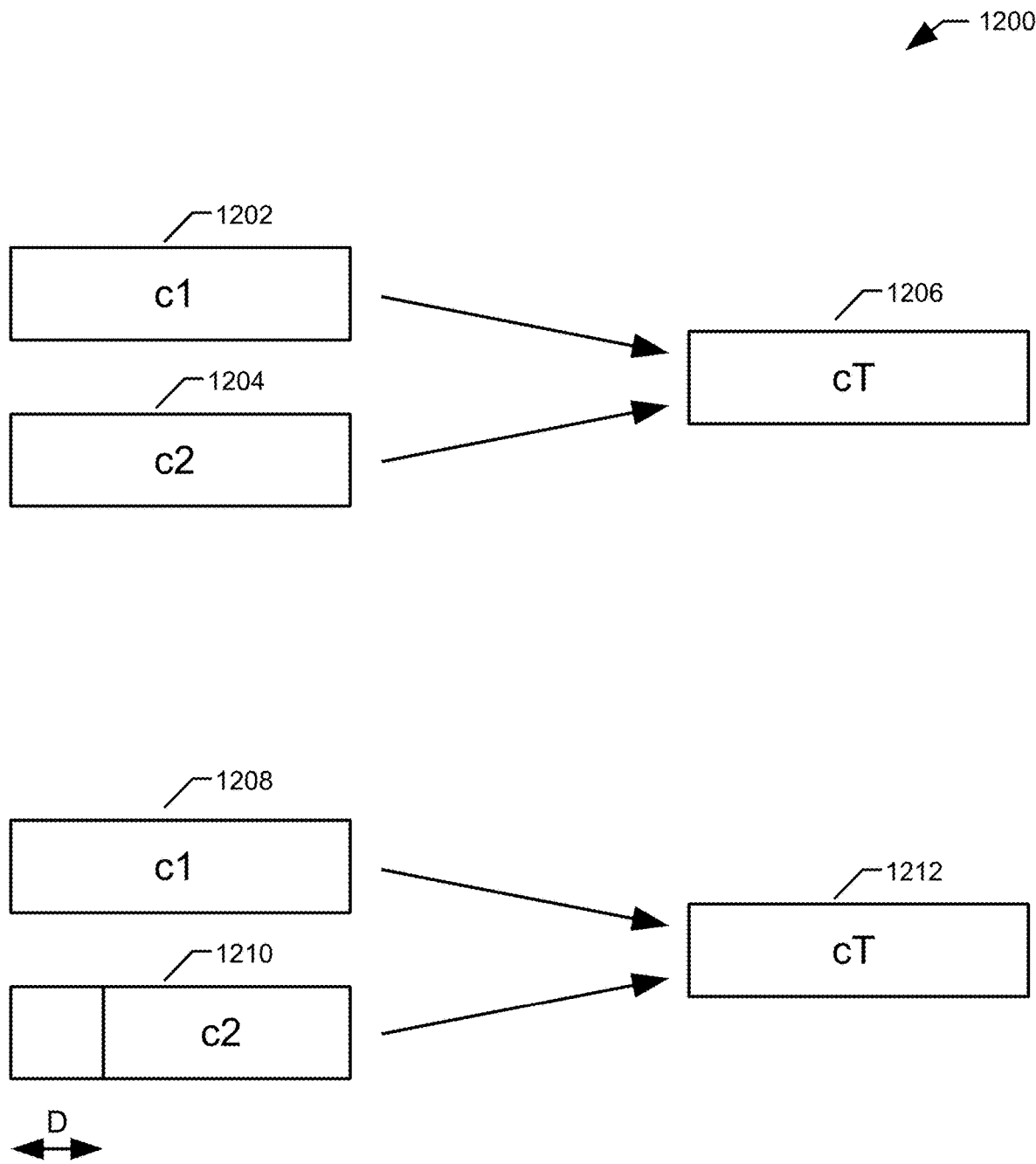
FIG. 12 illustrates an example of combining two or more chaotic sequences in order to increase the spectral efficiency of a chaotic communication system in accordance with an embodiment.

FIG. 12 illustrates an example 1200 of combining two or more chaotic sequences in order to increase the spectral efficiency of a chaotic communication system in accordance with an embodiment. Chaotic sequences typically are used to implement spread-spectrum communication systems. The general class of spread-spectrum communication systems, including spread-spectrum communication systems that use binary spreading sequences, has a disadvantage of poor spectral efficiency. In other words, the bandwidth required to transmit a spread-spectrum signal is typically much larger than the actual data rate supported by the spread-spectrum communication system. Spread-spectrum chaotic communication systems as implemented by the current state-of-the-art typically suffer from poor spectral efficiency as well. Note that in the following discussion, the terms "chaotic sequence," "discrete-time chaotic sequence," "chaotic waveform" or "discrete-time chaotic waveform" may be used interchangeably.

The example 1200 illustrated in FIG. 12 is an example of a method that uses multiple chaotic sequences to increase the spectral efficiency of the chaotic communication system, i.e. increase the data rate without having to increase the sample rate or bandwidth of the system. The Chaotic Code Multiplexing scheme described herein is an example of a method of increasing the spectral efficiency of a chaotic communication system by transmitting different combinations of multiple chaotic sequences simultaneously. In some embodiments, a first chaotic sequence c1 1202 of a specific temporal length is combined with a second chaotic sequence c2 1204 of the same temporal length to generate a composite chaotic sequence cT 1206 that has the same temporal length as the first chaotic sequence c1 1202. Composite chaotic sequence cT 1206 is constructed with the initial, or starting, points of the first chaotic sequence c1 1202 and the second chaotic sequence c2 1204 are aligned. In some embodiments, composite chaotic sequence cT 1206 is constructed by the addition of the first chaotic sequence c1 1202 and the second chaotic sequence c2 1204. In this embodiment, if this composite chaotic sequence cT 1206 is transmitted to a receiver and is demodulated by the receiver by using, for example, identical replica sequences of the first chaotic sequence c1 1202 and the second chaotic sequence c2 1204 by separately using matched-filter correlators, the correlation peaks associated with the correlation of the first chaotic sequence c1 1202 and the second chaotic sequence c2 1204 will be aligned, being located at the initial points of the respective correlation functions. In other words, the difference between the starting point of the correlation peak associated with the first chaotic sequence c1 1202 and the correlation peak associated with the second chaotic sequence c2 1204 is 0. This alignment of the correlation peaks could correspond, for example, to a data symbol of "0" that is meant to be communicated to the receiver by the transmitter.

Additional data symbols can be encoded into the composite chaotic sequence cT 1206 by introducing temporal phase shifts into the second chaotic sequence c2 1204. In some embodiments, to introduce additional data symbols into the system, the starting point of the second chaotic sequence c2 1204 can be shifted by D samples in the time-domain, with the residual samples of the second chaotic sequence c2 1204 being wrapped around the starting point of the second chaotic sequence c2 1204 to give a shifted second chaotic sequence c2 1210. Note that the temporal length of the shifted second chaotic sequence c2 1210 is the same as the temporal length of the second chaotic sequence c2 1204 which, in turn, has the same temporal length of the first chaotic sequence c1 1202. Shifted chaotic sequence c2 1210 is combined with a first chaotic sequence c1 1208 (which is the same as the first chaotic sequence 1202), to give a composite chaotic sequence cT 1212 that is the same temporal length as the first chaotic sequence c1 1208. Now, if the composite chaotic sequence cT 1212 is transmitted to a receiver and is demodulated by the receiver by using, for example, identical replica sequences of the first chaotic sequence c1 1208 and the second chaotic sequence c2 1204 (not the shifted second chaotic sequence c2 1210) by separately using matched-filter correlators, the correlation peaks associated with the correlation function associated with the first chaotic sequence c1 1208 and the correlation function associated with the shifted second chaotic sequence c2 1210 will not be aligned. Instead, there will be a difference of D samples between the starting point of the correlation peak associated with the first chaotic sequence c1 1208 and the correlation peak associated with the second chaotic sequence c2 1204. This alignment difference between the correlation peaks could correspond, for example, to a specific data symbol that is meant to be communicated to the receiver by the transmitter.

In a particular example, the first chaotic sequence c1 1202 has a temporal length of 1024 points. If the second chaotic sequence c2 1204 is combined with the first chaotic sequence to form composite chaotic sequence cT 1206 then, as discussed above, the correlation peaks associated with the first chaotic sequence c1 1202 and the second chaotic sequence c2 1204 are aligned at the receiver with zero shift between the correlation peaks, and this can correspond to a data symbol of "0." If the second chaotic sequence c2 1204 is temporally phase-shifted by one sample to get the shifted second chaotic sequence c2 1210 (D=1). Based on the above discussion, there will be a 1-sample difference between the correlation peaks associated with the correlation function of the first chaotic sequence c1 1208 and the correlation function of the shifted second chaotic sequence c2 1210 at the receiver, and this can correspond, for example, to a data symbol of "1." We can extend the above argument to a generalized temporal phase-shift of D=n samples on the shifted second chaotic sequence 1210, where a shift of D=n samples corresponds to a data symbol "n." Since the temporal length of the first chaotic sequence c1 1202 and the temporal length of the second chaotic sequence c2 1204 for this example is 1024 points, it is straightforward to see that D can go up to a maximum number of 1023, for a total of 1024 possible temporal phase-shifts (starting from a temporal phase-shift of 0). Thus, the data symbols associated with these 1024 possible temporal phase-shifts can range from 0 to 1023, corresponding to a 10-bit wide binary data word. Therefore, the communication scheme can now receive 10-bit wide binary data words at the transmitter and transmit these 10-bit wide binary data words to a receiver via temporal phase-shift coding via shifted second chaotic sequence c2 1210. In order to see how spectral efficiency has increased, suppose the base data rate associated with the first chaotic sequence temporal length is R. Using the temporal phase shifting method, the method has been able to increase the data rate to 10R, without requiring any increase in bandwidth or sample rate. For example, if the sample rate associated with the first chaotic sequence c1 is 1.024 MHz. For a 1024-point chaotic sequence length, there is a base data rate of 1 kbps. Using a second chaotic sequence such as the shifted second chaotic sequence c2 1210 and employing the temporal phase-shifting technique described above, the data rate can be increased to 10 kbps.

In the above scheme, the first chaotic sequence c1 1202 (or 1208) serves as a reference chaotic waveform, also known as a pilot chaotic waveform, a reference chaotic sequence or a pilot chaotic sequence, that provides a reference correlation peak. In some embodiments, the reference chaotic sequence may be any one or a combination of an amplitude-modulated chaotic waveform, a frequency-modulated chaotic waveform or a phase-modulated chaotic waveform as discussed above. The shifted second chaotic sequence c2 1210 serves as an auxiliary chaotic waveform, or data-carrying chaotic waveform, also known as an auxiliary chaotic sequence or a data-carrying chaotic sequence, where a shift in the starting point of the shifted second chaotic sequence c2 1210 is used as a measure of the encoded data symbol. In some embodiments, the data-carrying chaotic waveform may be any one or a combination of an amplitude-modulated chaotic waveform, a frequency-modulated chaotic waveform or a phase-modulated chaotic waveform as discussed above. From the above discussion, it is understood that if there are N allowed temporal phase shifts in the shifted second chaotic sequence c2 1210, there is an increase in the data rate corresponding to $\log_2 N$ over the base data rate.

Another advantage of using chaotic waveforms for implementing the above phase-shifting scheme is waveform diversity. In other words, a large ensemble of chaotic waveforms can be generated, and this property can be used to further improve the spectral efficiency of the system. Other spread-spectrum sequences such as binary spreading sequences do not have this kind of waveform diversity. In other words, a far greater number of chaotic sequences of a given length can be generated as compared to their binary counterparts. Another advantage that chaotic sequences have over binary spreading sequences is that chaotic sequences can be generated to be of any arbitrary length. Thus, while the above example presented a chaotic sequence length of 1024 points, this length is not restrictive. The chaotic sequence length could be 1000 points, or 2000 points without adversely affecting their quasi-orthogonal correlation properties. Binary spreading sequences, on the other hand, do not have this flexibility since they have to be of lengths that are functions of powers of 2. The ability to generate chaotic sequences of any arbitrary length allows greater flexibility in the design of robust, spectrally efficient communication systems by offering a larger number of degrees of freedom to the system designer.

Returning to the above example, select the shifted second chaotic sequence c2 1210 as a single waveform from a larger ensemble of, say 16 chaotic waveforms, then for a total number of 1024 allowable shifts (including a zero phase shift), the net increase in data rate is:

$$\log_2(1024 \times 16) = 14 \text{ times the base data rate.}$$

In general, if there are N allowable phase shifts (including a zero phase shift) with an ensemble of M chaotic waveforms, of which one chaotic waveform is selected at a time for the shifted second chaotic sequence c2 1210, then the net increase in data rate is:

$$\log_2(M \times N) = \log_2 M + \log_2 N.$$

By using large ensembles of chaotic waveforms, these systems can greatly improve the spectral efficiency of this class of systems. Using a diverse set of chaotic waveforms in a manner described above also helps with system security. By mapping a large ensemble of data symbols to a large ensemble of chaotic sequences increases the diversity of the data-mapping codebook and the corresponding encoding scheme used to transmit data. This makes it that much more difficult for an attacker or interceptor to decipher the information being carried by a similar chaotic communications channel.

While the example 1200 illustrated in FIG. 12 shows two chaotic sequences—a first chaotic sequence c1 1202 and a second chaotic sequence c2 1204 being combined, it is possible to combine multiple sets of shifted chaotic sequences. For example, we can have additional shifted chaotic sequence c3, shifted chaotic sequence c4 and so on, included in the composite chaotic sequence cT 1212. In general, for a single reference chaotic sequence such as the first chaotic sequence c1 1202, if there are P data-carrying chaotic sequences transmitted simultaneously with each data-carrying chaotic sequence being independently phase-shifted through N possible points, then it is straightforward to show that net increase in the data rate over the base data rate is given by $$P \log_2 N.$$

For example, if the system transmits 3 data-carrying chaotic sequences in addition with the reference chaotic sequence, then for a total of 1024 allowable temporal phase-shifts, the net increase in data rate is 3×10=30 times the base data rate. Thus, the base data rate of 1 kbps as described above can be increased to 30 kbps using 3 data-carrying chaotic sequences. Furthermore, if the P simultaneously-transmitted data-carrying chaotic sequences are transmitted from an ensemble of M chaotic sequences (M>P), then the net increase in data rate is given by:

$$\log_2(N^P C^M_P) = P \log_2 N + \log_2 C^M_P,$$

where $C^M_P$ is the combinatorial operator, defined as $$C^M_P = M!/P!(M-P)!.$$

For example, if 3 data-carrying chaotic sequences are transmitted along with a reference chaotic sequence with 1024 phase shifts allowed and the data-carrying chaotic sequences are selected from an ensemble of 16 chaotic sequences, then the increase in data rate can be shown to be 39.129 times the base data rate. Using the techniques outlined above, the spectral efficiency of chaotic communication systems can be improved.

Figure 13:
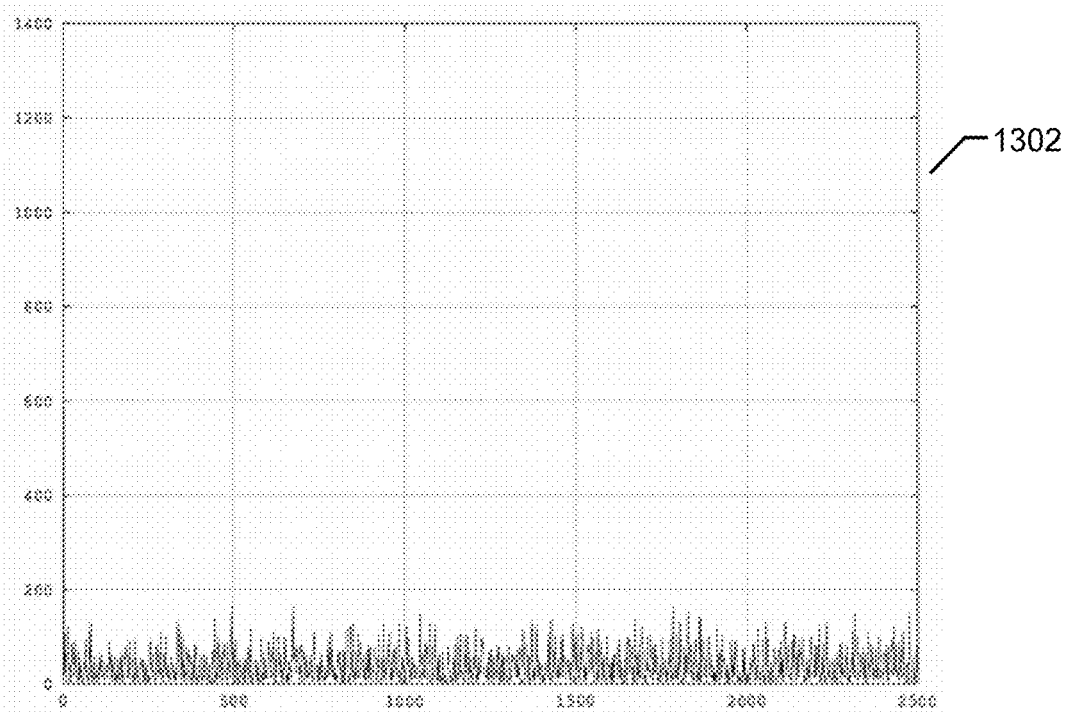
FIG. 13 illustrates an example of how correlation peaks of two or more chaotic signals can be used to carry communication symbols in accordance with an embodiment.
Figure 13:
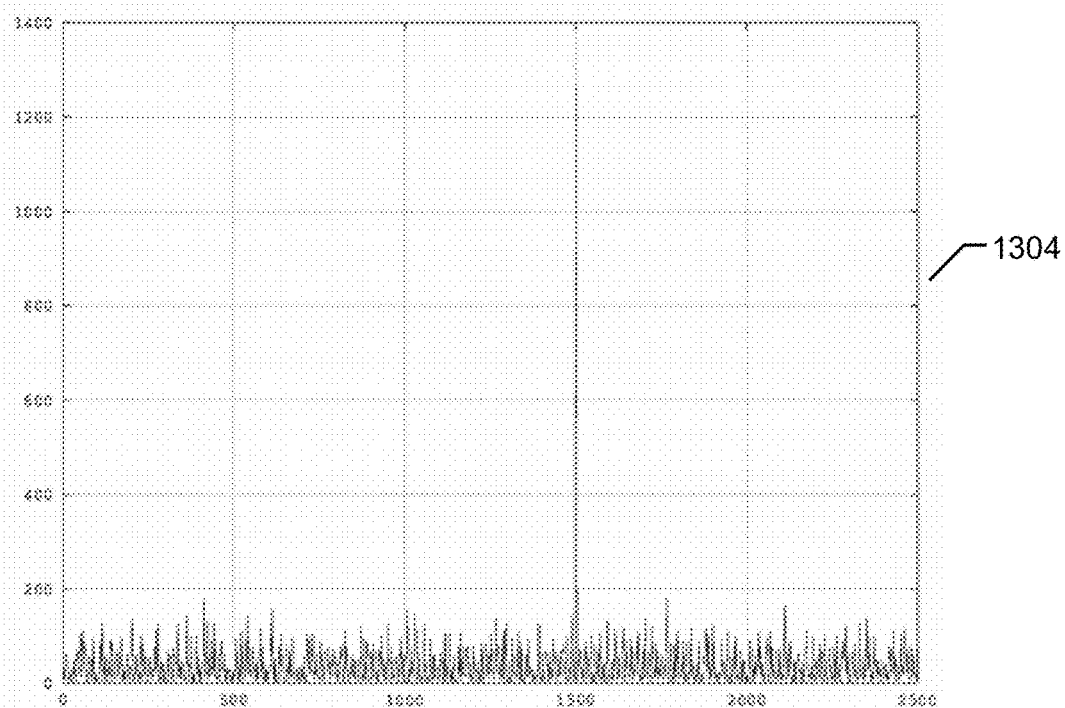

FIG. 13 illustrates an example 1300 of how correlation peaks of two or more chaotic signals can be used to carry communication symbols in accordance with an embodiment. In some embodiments, a reference chaotic signal is transmitted along with a data-carrying chaotic signal as discussed above. At the receiver, a matched filter or similar correlation algorithm may be used to determine the starting point of the reference chaotic signal. An example correlation plot of the reference chaotic signal is represented by the plot 1302. An example correlation plot of the data-carrying chaotic signal is represented by the plot 1304. The temporal phase shift between the correlation peak associated with the reference chaotic signal and the correlation peak associated with the data-carrying chaotic signal is shown by the plot 1302 and the plot 1304.

In this example, the temporal shift between the correlation peak associated with the reference chaotic signal and the correlation peak associated with the data-carrying chaotic signal is 1500 points, with the correlation length of both the reference chaotic signal and the data-carrying chaotic signal each being 2500 points. For the sake of simplicity, let us assume that out of the 2500 points associated with the correlation length, only the first 2048 temporal phase shifts (including the zero phase shift) are used to encode data. This corresponds to a log 2 2048=11-bit word width, where the binary representation corresponding to the zero temporal phase shift is 00000000000, and the binary representation corresponding to a temporal phase shift of 2047 points is 11111111111. Using this encoding scheme, the temporal phase shift of 1500 points that is the difference between the two individual correlation peaks 1302 and 1304 corresponds to a data symbol represented as 10111011100 in a binary format. In this way, the temporal phase shift between the reference chaotic signal and the data-carrying chaotic signal is mapped to a data symbol belonging to an a priori determined alphabet or codebook. The receiver, having an a priori knowledge of this data symbol mapping, can then demodulate the received chaotic signal combination, determine the phase shift between the reference chaotic signal and the data-carrying chaotic signal, and decode the corresponding binary data symbol.

Figure 14:
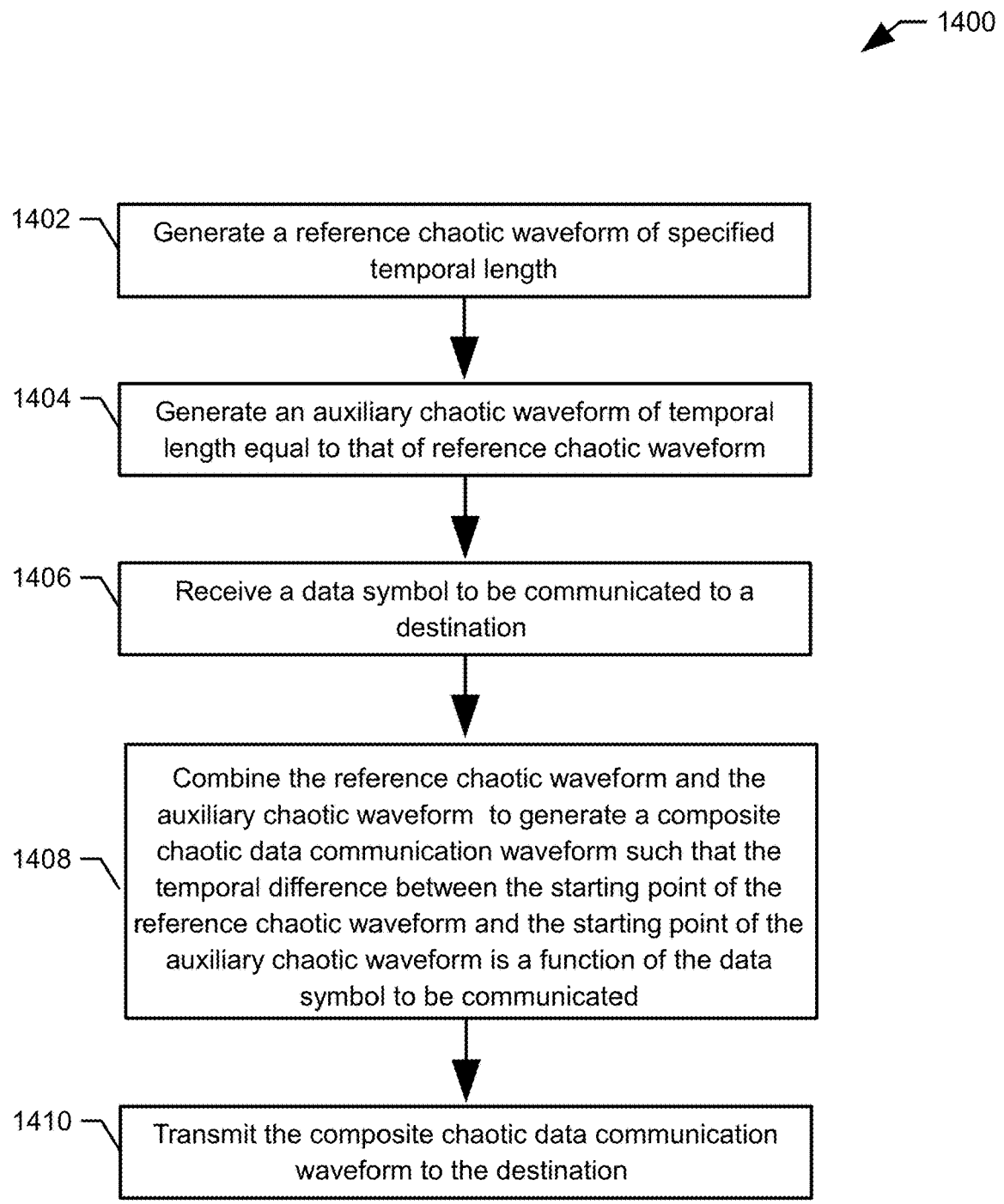
FIG. 14 illustrates a flow diagram that describes a method for combining two chaotic waveforms at a transmitter associated with a chaotic communication system in accordance with an embodiment.

FIG. 14 illustrates a flow diagram that describes a method 1400 for combining two chaotic waveforms at a transmitter associated with a chaotic communication system in accordance with an embodiment. At 1402, the method generates a reference chaotic waveform of a specific temporal length. Example temporal lengths include 1024 point lengths or 2048 point lengths as discussed in the examples above. Shorter temporal lengths such as 125 points can also be used, as can longer temporal lengths such as 20000 points. The temporal length is typically a design parameter that may be selected as a part of the system design process, and may be a function of parameters that include but are not limited to required data rates, signal-to-noise ratio, bit error rates and so on. The advantage of using chaotic waveforms for the design of spread-spectrum systems is that there is a great degree of flexibility in choosing an appropriate waveform length to suit a particular application, since a chaotic sequence of any practically arbitrary length can be generated without any constraints on the temporal length of the sequence.

Note that the term "reference chaotic waveform" is used synonymously with the term "reference chaotic sequence" described earlier. In some embodiments, the reference chaotic waveform may be one or any combination of an amplitude-modulated chaotic waveform, a frequency-modulated chaotic waveform or a phase-modulated chaotic waveform. Next, at 1404, the method generates an auxiliary chaotic waveform of temporal length equal to that of the reference chaotic waveform. Note that the term "auxiliary chaotic waveform" is used synonymously with the term "data-carrying chaotic sequence" described earlier. In some embodiments, the auxiliary chaotic waveform may be one or any combination of an amplitude-modulated chaotic waveform, a frequency-modulated chaotic waveform or a phase-modulated chaotic waveform. Generally speaking, the term "chaotic waveform" and "chaotic sequence" may be used interchangeably.

At 1406, the method receives a data symbol to be communicated to a destination. In some embodiments, the data symbol may be a binary word with multiple bits. Next, at 1408 the method combines the reference chaotic waveform and the auxiliary chaotic waveform to generate a composite chaotic data communication waveform of length equal to the reference chaotic waveform such that the temporal difference between the starting point of the reference chaotic waveform and the starting point of the auxiliary chaotic waveform is based on a predetermined function or predetermined mapping of the data symbol to be communicated. Note that the term "composite chaotic data communication waveform" is used synonymously with the term "composite chaotic sequence" described earlier. In some embodiments, the reference chaotic waveform and the auxiliary chaotic waveform may be pointwise-combined additively. In other embodiments, more than one auxiliary chaotic waveform may be used in conjunction with the reference chaotic waveform to generate the composite chaotic data waveform using combinatorial methods such as addition as described above. Finally, at 1410, the method transmits the composite chaotic data communication waveform to the destination.

Figure 15:
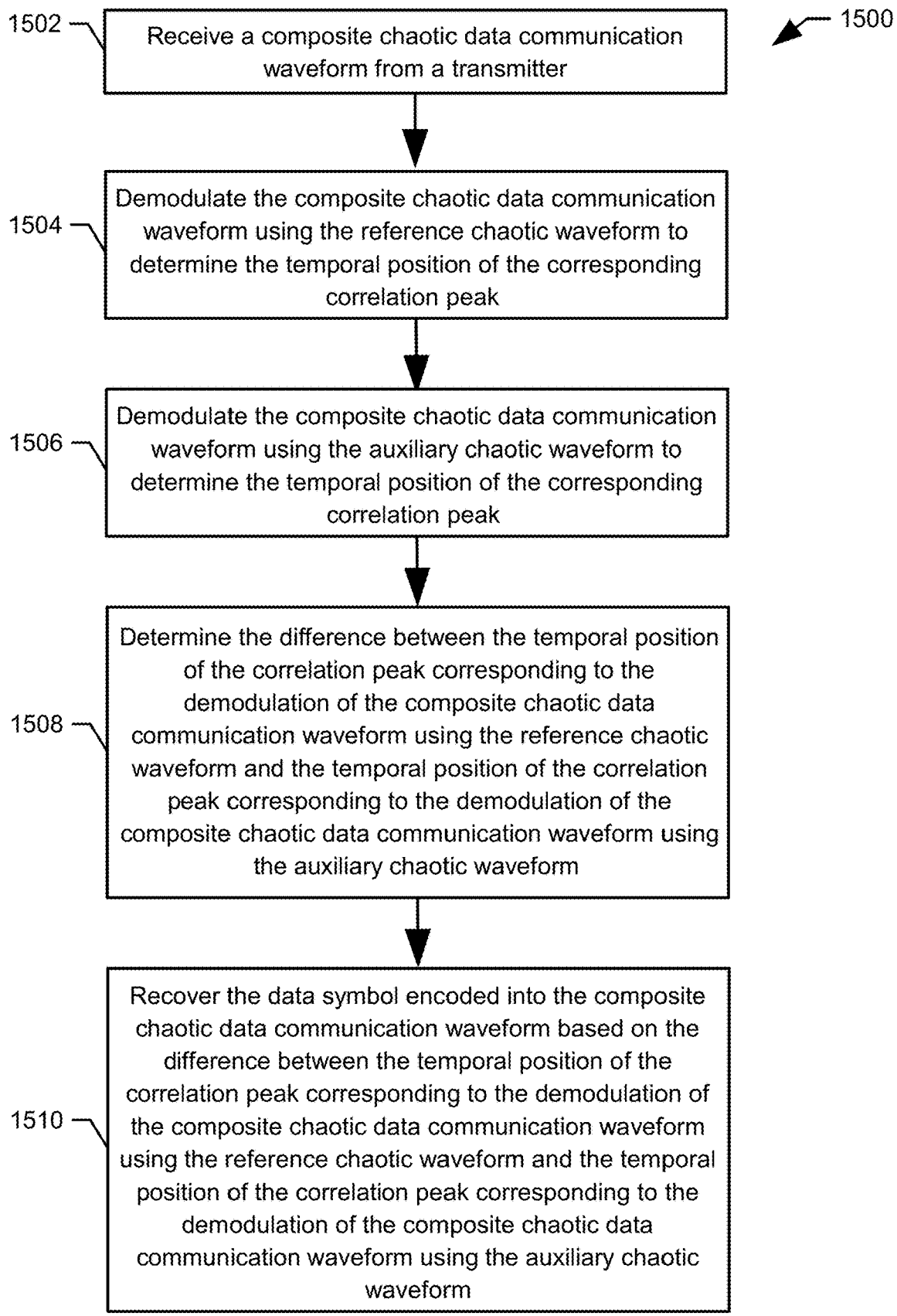
FIG. 15 illustrates a flow diagram that describes a method for receiving and demodulating a combination of two chaotic waveforms at a receiver associated with a chaotic communication system in accordance with an embodiment.

FIG. 15 illustrates a flow diagram that describes a method 1500 for receiving and demodulating a combination of two chaotic waveforms at a receiver associated with a chaotic communication system in accordance with an embodiment. At 1502, the method receives a composite chaotic data communication waveform from a transmitter. Next, at 1504, the method demodulates the composite chaotic data communication waveform using the reference chaotic waveform to determine the temporal position of the corresponding correlation peak. Next, at 1506, the method demodulates the chaotic data communication waveform using the auxiliary chaotic waveform to determine the temporal position of the corresponding correlation peak. In some embodiments, the chaotic waveform demodulation functions may be performed using correlation functions that my include implementations of the matched filter. The method then proceeds to 1508 where it determines the difference between the temporal position of the correlation peak corresponding to the demodulation of the composite chaotic data communication waveform using the reference chaotic waveform and the temporal position of the correlation peak corresponding to the demodulation of the composite chaotic data communication waveform using the auxiliary chaotic waveform.

At 1510, the method recovers the data symbol encoded at the transmitter into the composite chaotic data communication waveform based on the difference between the temporal position of the correlation peak corresponding to the demodulation of the composite chaotic data communication waveform using the reference chaotic waveform and the temporal position of the correlation peak corresponding to the demodulation of the composite chaotic data waveform using the auxiliary chaotic waveform. The recovery of the encoded data symbol is based on a predetermined function or predetermined mapping of the data symbol shared a priori by the transmitter and the receiver. In some embodiments, multiple auxiliary chaotic waveforms may be included in the composite chaotic data communication waveform. In these embodiments, the receiver demodulates the composite chaotic data communication waveform using each of these auxiliary chaotic waveforms, to determine the position of each of the respective correlation peaks with reference to the correlation peak associated with the reference chaotic waveform. The difference in correlation peaks is mapped to the relevant set of data symbols as per a predetermined rule. An example of a rule that maps a temporal difference between the correlation peak associated with the reference chaotic waveform and the correlation peak associated with the data-carrying chaotic waveform to a set of data symbols has been presented above in the discussion of FIG. 13.

Figure 16:
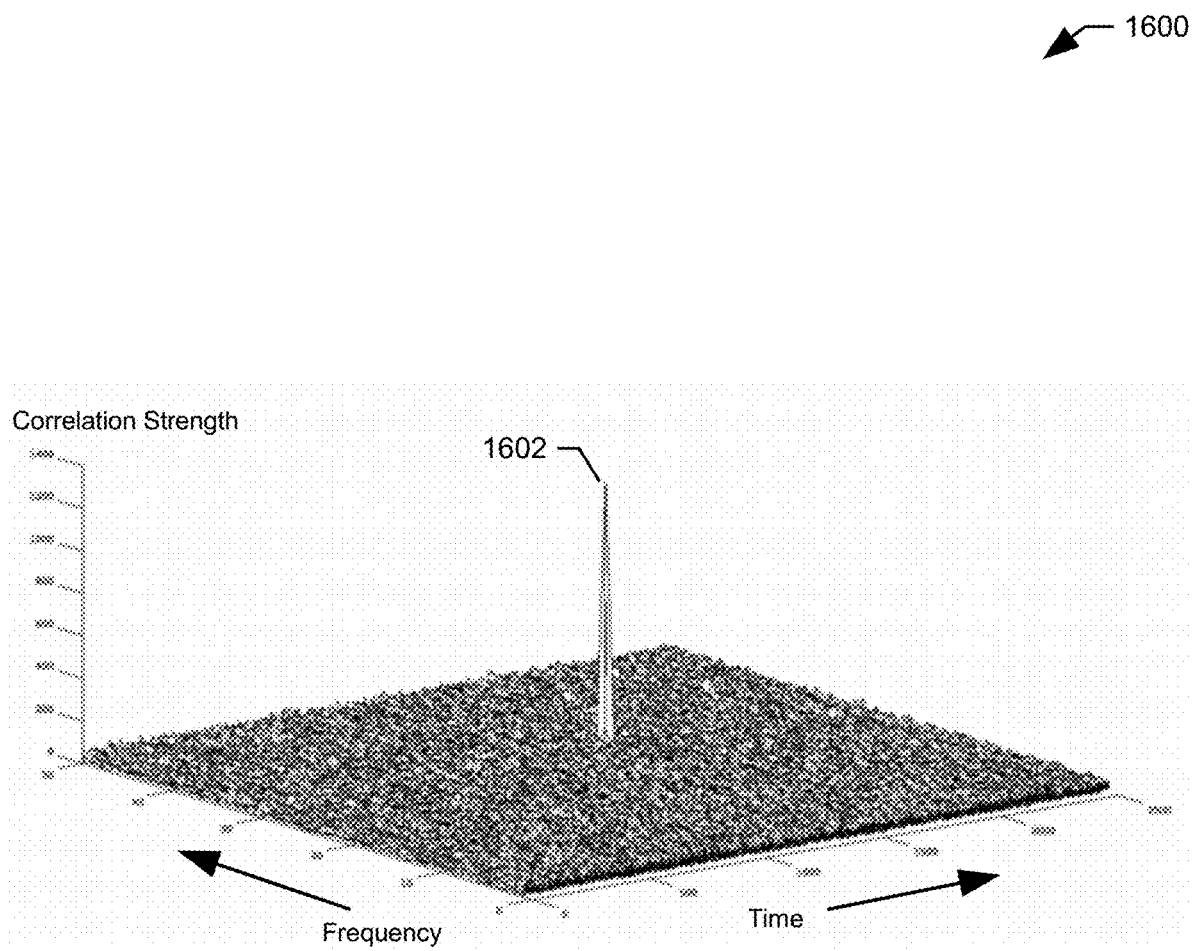
FIG. 16 illustrates a graphical plot that illustrates two possible degrees of freedom used to increase spectral efficiency in accordance with an embodiment.

FIG. 16 illustrates a graphical plot 1600 that illustrates two possible degrees of freedom used to increase spectral efficiency in accordance with an embodiment. While the description above covered the temporal shifts of an auxiliary chaotic sequence (i.e., shifts in the time domain), in some embodiments, time-domain shifts can be performed along with frequency-domain shifts. In other words, the frequency of the carrier signal associated with the auxiliary chaotic sequence may be shifted relative to the frequency of the carrier signal associated with the reference chaotic sequence. This method further helps increase the spectral efficiency of the chaotic communication system. For example, if $c_{1k}$ corresponds to the reference chaotic sequence where k is the time index and similarly $c_{2k}$ corresponds to the auxiliary chaotic sequence, then for a carrier frequency of $f_1$, the reference chaotic sequence, assuming a frequency-modulated chaotic communication system, is given by $$s_{1k} = \cos[2\pi(f_1 + \alpha_1 c_{1k})k]$$

where $\alpha_1$ is a scaling factor associated with the reference chaotic sequence. Similarly, the auxiliary chaotic sequence (frequency-modulated) is given by $$s_{2k} = \cos[2\pi(f_2 + \alpha_2 c_{2k})k]$$

where $\alpha_2$ is a scaling factor associated with the auxiliary chaotic sequence. Now, suppose $f_1$ is fixed and $f_2$ can take on F number of distinct values, corresponding to deliberately-induced frequency shifts in the carrier of the auxiliary chaotic sequence. These frequency shifts can also be referred to as frequency bins. The reference chaotic sequence and the auxiliary chaotic sequence are thus combined, with both time-domain and frequency-domain shifts introduced into the auxiliary chaotic sequence, and transmitted to the receiver. The receiver now searches over all time-domain shifts and frequency-domain shifts (frequency bins) to determine the correlation peak associated with the auxiliary chaotic sequence referenced to the time-domain and frequency-domain correlation peak of the reference chaotic signal. For N time-domain shifts and F frequency domain shifts, it can be shown that for a base data rate of R associated with transmitting the reference chaotic sequence alone, the data rate increase due to time-domain and frequency-domain shifts associated with the auxiliary chaotic sequence is given by $$R \log_2(NF) = R(\log_2 N + \log_2 F)$$

For example, if N=1024, F=256 and R=10 kbps, then the increase in data rate using the time-domain and frequency-domain shifting techniques is $$10 \log_2(1024 \times 256) = 180 \text{ kbps}.$$

This example has thus achieved an 18× increase in the data rate over the base data rate. These additional computations would require a more powerful processor at the receiver, but with the constant increase in computing power, implementing these algorithms presents a small tradeoff compared to the benefit of the increase in spectral efficiency. FIG. 16 presents a plot 1600 that shows a correlation peak 1602 as a three-dimensional plot versus the two-dimensional time-domain and frequency-domain space. The time-domain space and frequency-domain space give two degrees of freedom to the system designer to improve the spectral efficiency of the system. The correlation peak 1602 can now be shifted anywhere along the two-dimensional plane formed by the time axis and frequency axis. Each point in this two-dimensional plane can be made to correspond to a data symbol. The total number of possible data symbols that can fit into the plan depends on the granularity or the resolution along each axis. All the other techniques used to further increase spectral efficiency as described above (including selecting one or more auxiliary chaotic sequences from a larger chaotic waveform ensemble) can be used along with the time-domain and frequency-domain shifting techniques described here.

This illustrates the advantage of using chaotic sequences while availing of the associated waveform diversity. For example, contemporary waveforms such as sinusoids cannot be used efficiently for time-domain shifting since the periodicity of these waveforms introduces temporal phase ambiguities, thus reducing the total number of temporal phase shifts possible. Binary spreading sequences cannot be generated in large ensembles as chaotic sequences can; hence the latter provides much greater waveform diversity.

Figure 17:
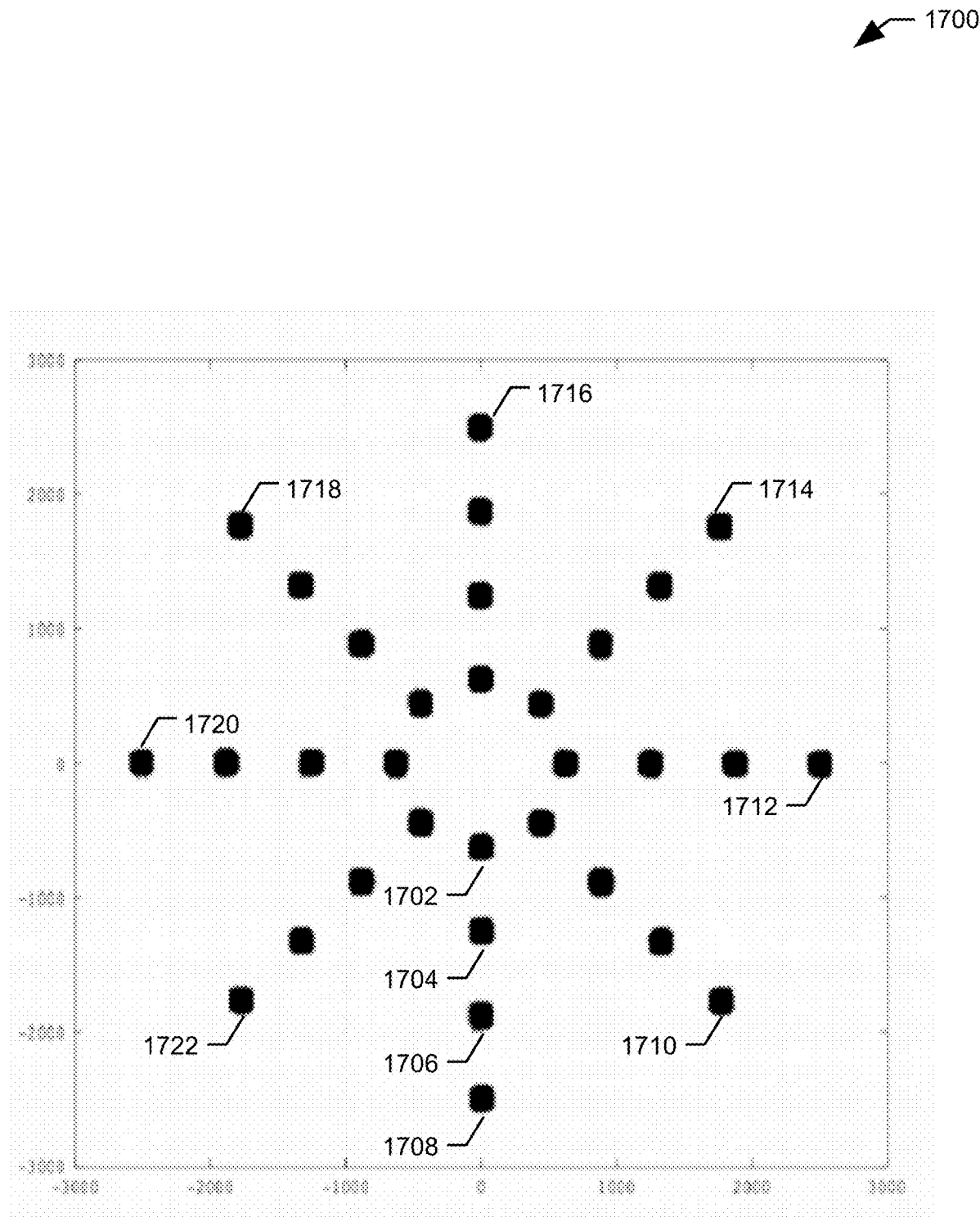
FIG. 17 is a graphical plot that illustrates how contemporary signal modulation techniques can be used in conjunction with chaotic modulation techniques to further increase spectral efficiency in accordance with an embodiment.

FIG. 17 is a graphical plot 1700 that illustrates how contemporary signal modulation techniques can be used in conjunction with chaotic modulation techniques to further increase spectral efficiency in accordance with an embodiment. In some embodiments, contemporary modulation techniques such as binary phase shift keying (BPSK), quadrature phase shift keying (QPSK), quadrature amplitude modulation (QAM), M-ary phase shift keying and so on can be included in conjunction with the methods described above to further increase spectral efficiency. For example, returning back to the frequency-modulated auxiliary chaotic sequence presented in the discussion of FIG. 16, BPSK modulation can be included in the auxiliary chaotic sequence as $$s_{2k} = \cos\left[2\pi(f_2 + \alpha_2 c_{2k})k + d\pi\right]$$

where d=0 or 1. At the receiver, once the correlation peak is determined, the sign of the correlation peak can be compared, for example, to the sign of the correlation peak associated with the reference chaotic signal. If the sign of the correlation peak associated with the auxiliary chaotic signal is the same as the sign of the correlation peak associated with the reference chaotic signal then the receiver infers that d=1, for example. Otherwise, the receiver infers that d=0. It is straightforward to show that using BPSK modulation increases the value of the increase in the data rate by unity. Thus, the value of 18 derived above in the discussion for time-domain and frequency-domain shifts in the description of FIG. 16 increases to a value of 19 by including BPSK modulation. FIG. 17 shows a signal constellation plot 1700 that includes phase-shift keying and amplitude modulation together on the auxiliary chaotic sequence. In the example signal constellation plot 1700, 4 amplitude levels and 8 phase levels are shown, for a total of 4×8=32 possible phase/amplitude points. For example, the four points 1702, 1704, 1706 and 1708 represent the 4 amplitude levels, while the points 1708, 1710, 1712, 1714, 1716, 1718, 1720 and 1722 represent the 8 phase levels. In 1700, each point in the plot is associated with an amplitude that can be one of any four values, and a phase that can be one of any eight values. The auxiliary chaotic signal can be, for example, written as $$s_{2k} = A\cos[2\pi(f_2 + \alpha_2 c_{2k})k + m\pi/4]$$

where A can be any one of ¼, ½, ¾ or 1, and m can be any one of 0, 1, 2, 3, 4, 5, 6, 7. Since there are a total of 32 possible phase and amplitude combinations, the corresponding increase in data rate is an added value of $\log_2 32 = 5$ to the data rate increase factor. Thus, for the example discussed in FIG. 16 where the increase in data rate is 18 times, the inclusion of the standard amplitude and phase modulation techniques as described here will increase the data rate increase to 18+5=23 times the base data rate. Thus, a base data rate of 10 kbps increased to 230 kbps, a marked improvement in the spectral efficiency of the system.

Figure 18:
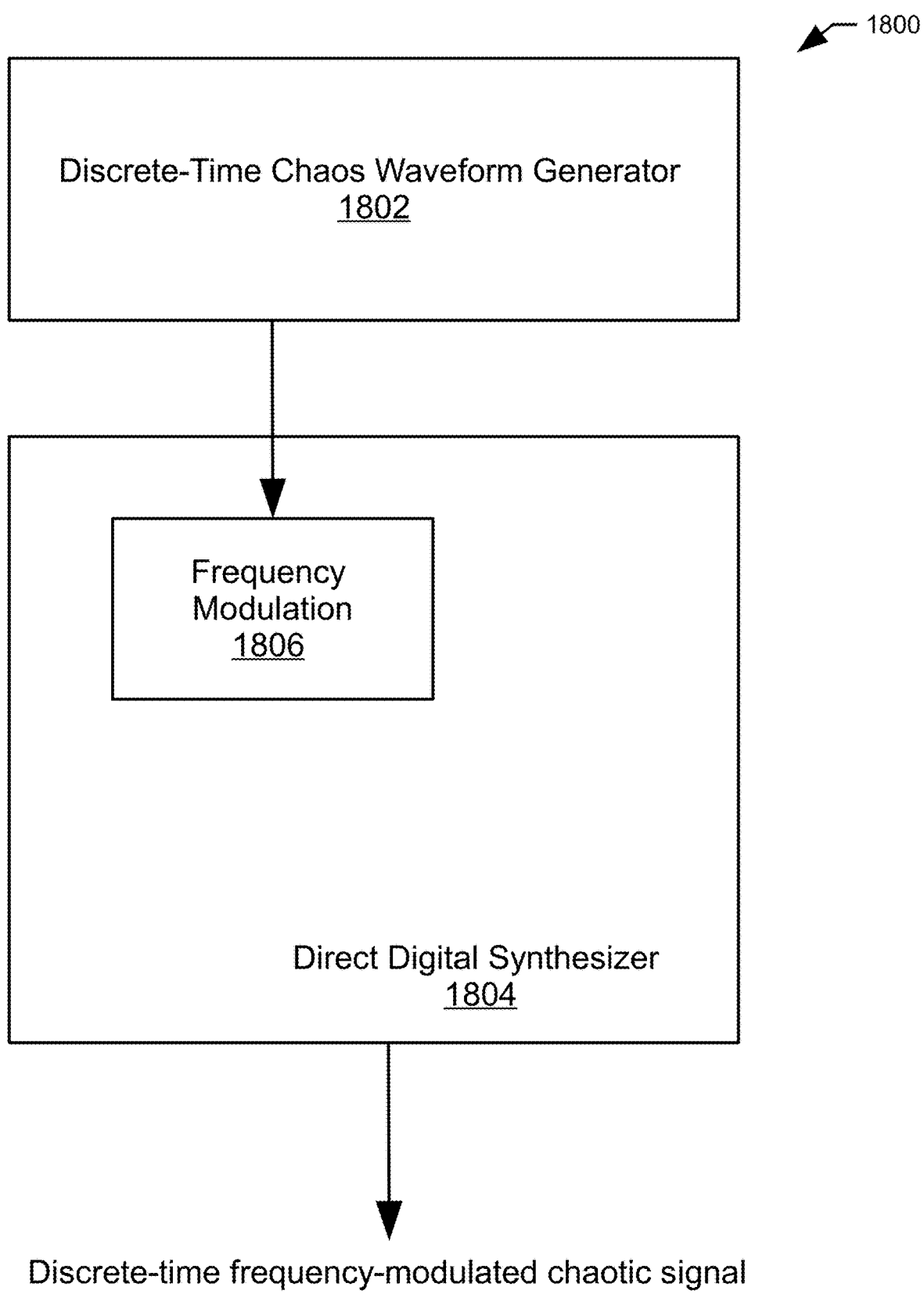
FIG. 18 illustrates a block diagram that depicts a system for generating a discrete-time frequency-modulated chaotic sequence in accordance with an embodiment.

FIG. 18 presents a block diagram that depicts a system 1800 for generating a discrete-time frequency-modulated chaotic sequence in accordance with an embodiment. From the basic definition presented above, consider a chaotic sequence $c_k$, where k is a time index. Then, for a frequency f, it can be shown that the function $$\cos\left[2\pi(f + \alpha c_k)k\right]$$

where $\alpha$ is a scaling factor, generates a frequency-modulated chaotic sequence output. Similarly, the equation $$\cos\left[2\pi fk + \alpha c_k\right]$$

generates a phase-modulated chaotic sequence output.

Since chaotic sequences are typically real-valued, generating these sequences using a digital processor typically involves using floating-point arithmetic. The implementation of floating-point arithmetic on a processor, whether native or emulated, is a relatively slow process and imposes a limit on how fast chaotic sequences can be generated in real-time. Fixed-point processing is an alternative to floating-point processing, providing the possibility of much faster sequence generation. The challenge is to adapt the chaos-generation algorithms to a fixed-point implementation.

Direct digital synthesizers, available both as hardware devices and software cores for digital processors such as FPGAs, generate digital signals that are trigonometric functions (sine and cosine functions). The frequency and phase of these sine and cosine functions can be controlled and programmed in real-time by an appropriate processing device such as a DSP or an FPGA, and can thus be used to generate frequency-modulated and phase-modulated chaotic sequences. In some embodiments, a discrete-time chaos waveform generator 1802 generates a real-time chaotic sequence that is input to a frequency modulation block 1806 within a direct digital synthesizer 1804. In some embodiments, the discrete-time chaos waveform generator 1802 may be the CORDIC-based chaos waveform generator described above. In other embodiments, the discrete-time chaos waveform generator may be another kind of fixed-point chaos waveform generator. The direct digital synthesizer 1806 is configured to generate sine and/or cosine digital sequences with a fundamental frequency f, and the chaotic sequence generated by the discrete-time chaos waveform generator 1802 frequency-modulates these sine and/or cosine digital sequences to produce one or more frequency-modulated chaotic signals as outputs.

The advantage of using direct digital synthesizers to generate frequency-modulated chaotic sequences (and phase-modulated chaotic sequences) is that direct digital synthesizers are capable of generating high data rate sequences in real-time, while also allowing the frequency and/or phase of these sequences to be programmed in real-time. Furthermore, direct digital synthesizers offer wide fixed-point input and output word widths. Using, for example, 32-bit fixed-point input and output words greatly increases the dynamic range of the system, providing a high quality, high rate frequency-modulated or phase-modulated chaotic sequence at the output of the direct digital synthesizer such as 1804. The use of a large output word width reduces the quantization error, while the use of a large input word width improves the resolution of the argument of the trigonometric function, allowing for fine frequency and/or phase deviations to be programmed into the direct digital synthesizer.

Figure 19:
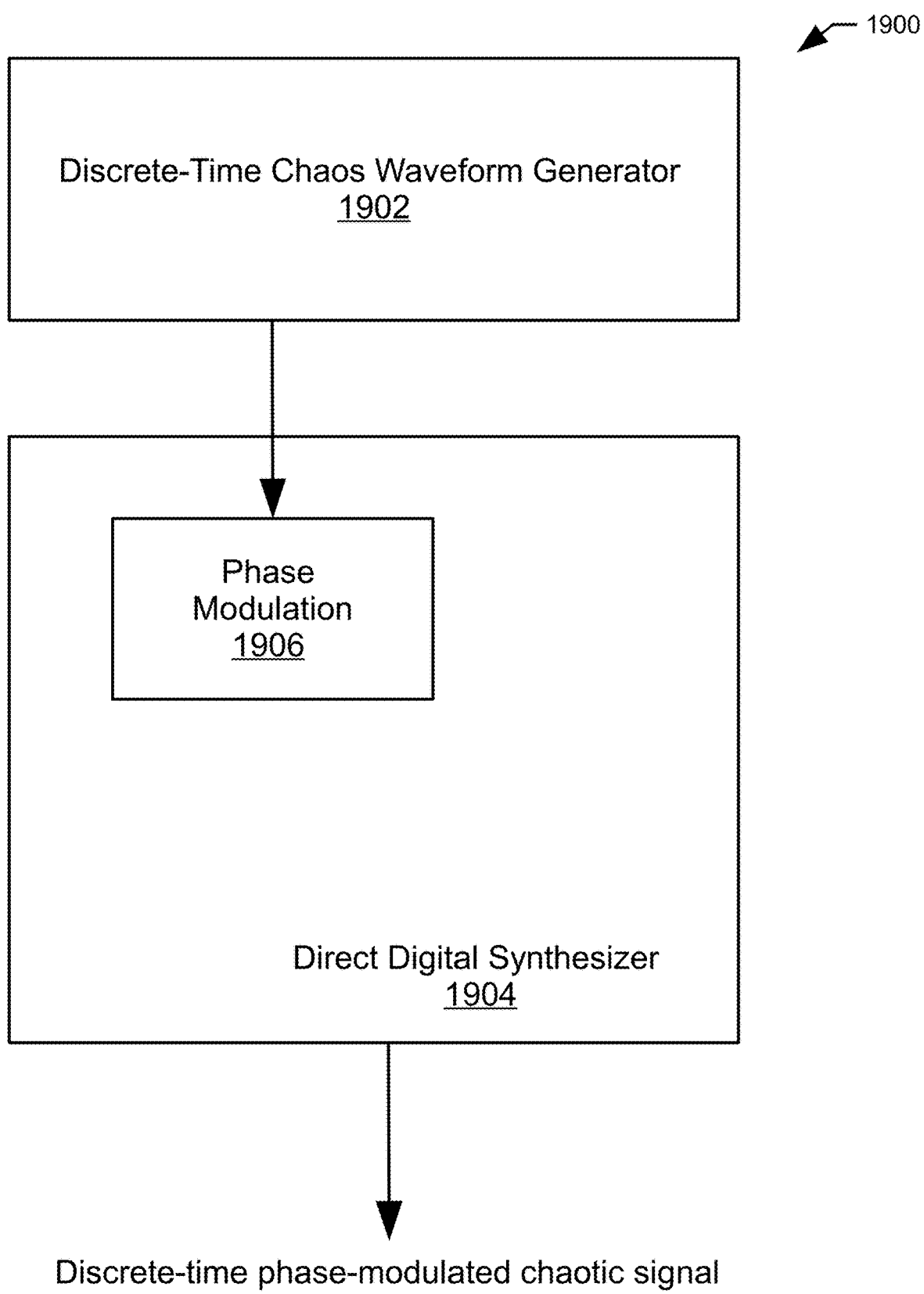
FIG. 19 illustrates a block diagram that depicts a system for generating a discrete-time phase-modulated chaotic sequence in accordance with an embodiment.

FIG. 19 presents a block diagram that depicts a system 1900 for generating a discrete-time phase-modulated chaotic sequence in accordance with an embodiment. In some embodiments, a discrete-time chaos waveform generator 1902 generates a chaotic sequence that is input to a phase modulation block 1906 of a direct digital synthesizer 1904. The chaotic sequence phase-modulates the sine and/or cosine waveforms generated by the direct digital synthesizer 1904 to give a discrete-time phase-modulated chaotic signal at the output of the direct digital synthesizer 1904, based on the discussion presented above.

Figure 20:
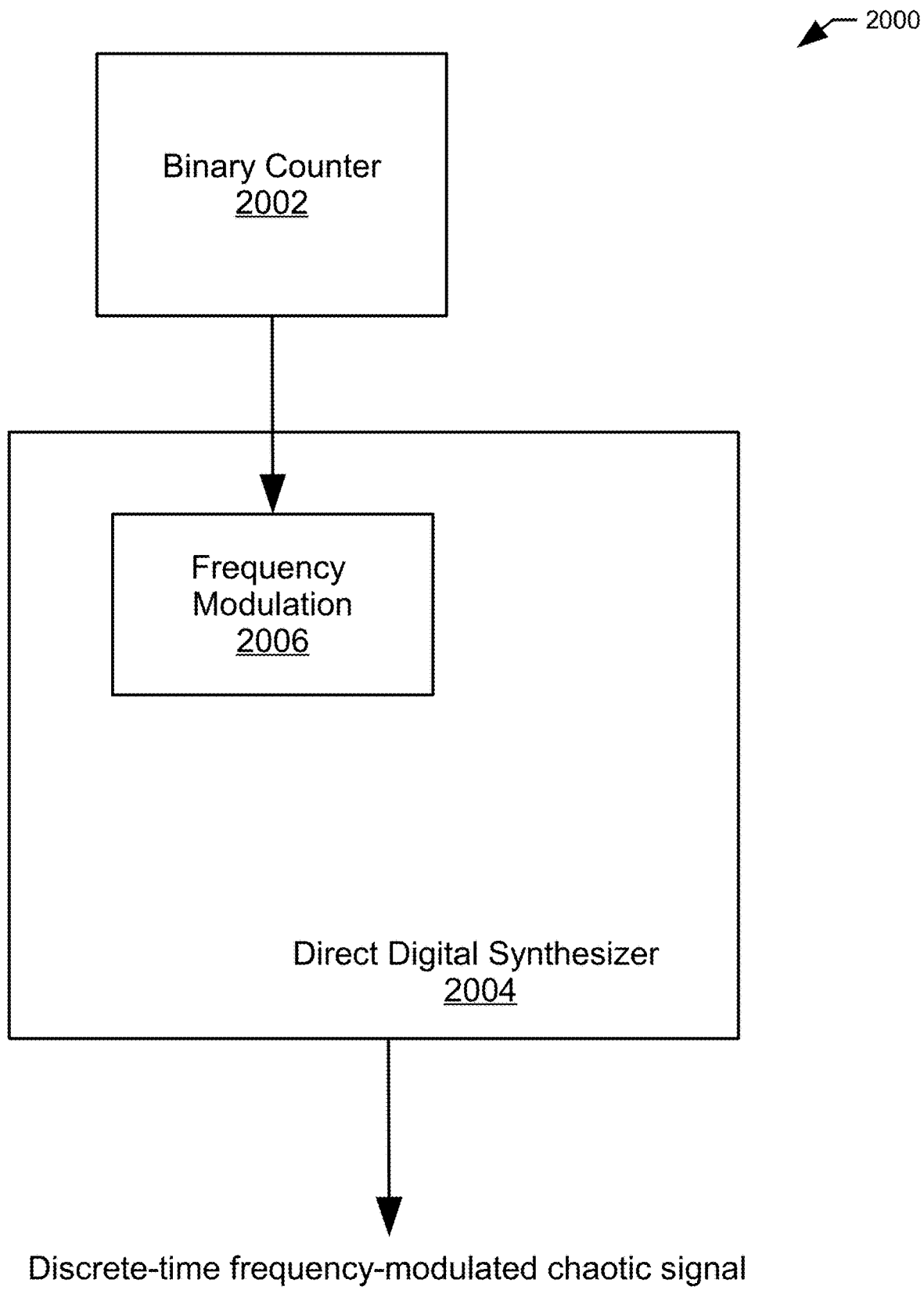
FIG. 20 illustrates a block diagram that depicts a system for generating a discrete-time frequency-modulated chaotic sequence in accordance with an embodiment.

FIG. 20 presents a block diagram that depicts a system 2000 for generating a discrete-time frequency-modulated chaotic sequence in accordance with an embodiment. In some embodiments, a binary counter 2002 of appropriate word width is used to generate a progressively increasing integer value as an input to a frequency modulation block 2006 of a direct digital synthesizer 2004. It can be shown that this configuration can generate a discrete-time frequency-modulated chaotic sequence. For a word width of N associated with the binary counter 2002, the binary counter 2002, starting at zero, resets after it reaches a count of $2^N-1$; however since the binary counter output is now the argument of a sine and/or cosine function, the phase of the sine and/or cosine functions at the time the binary counter resets may not be the same as that at the beginning of the previous counter cycle. Due to this phenomenon, it is possible that the discrete-time frequency-modulated chaotic waveform generated during a new cycle may be entirely different from the discrete-time frequency-modulated chaotic waveform generated during a previous cycle. The phenomenon of the phase in the sine and/or cosine functions thus may enable a chaotic sequence of a longer temporal length to be generated without repetition. The use of the direct digital synthesizer 2004 allows for discrete-time chaotic sequences to be generated at high rates in fixed-point format. This technique can be used in conjunction with all the chaotic modulation and generation schemes discussed above, including frequency-modulation and phase-modulation using chaotic sequences.

The binary counter 2002 may be configured to count up in ones, or the binary counter 2002 may be configured to count down in ones, thereby generating different chaotic sequences. Generalizing this concept, the increment (or decrement) in the binary counter is not limited to one; an increment or decrement of any integer value can be used, and this diversity generates an entire ensemble of chaotic sequences.

Figure 21:
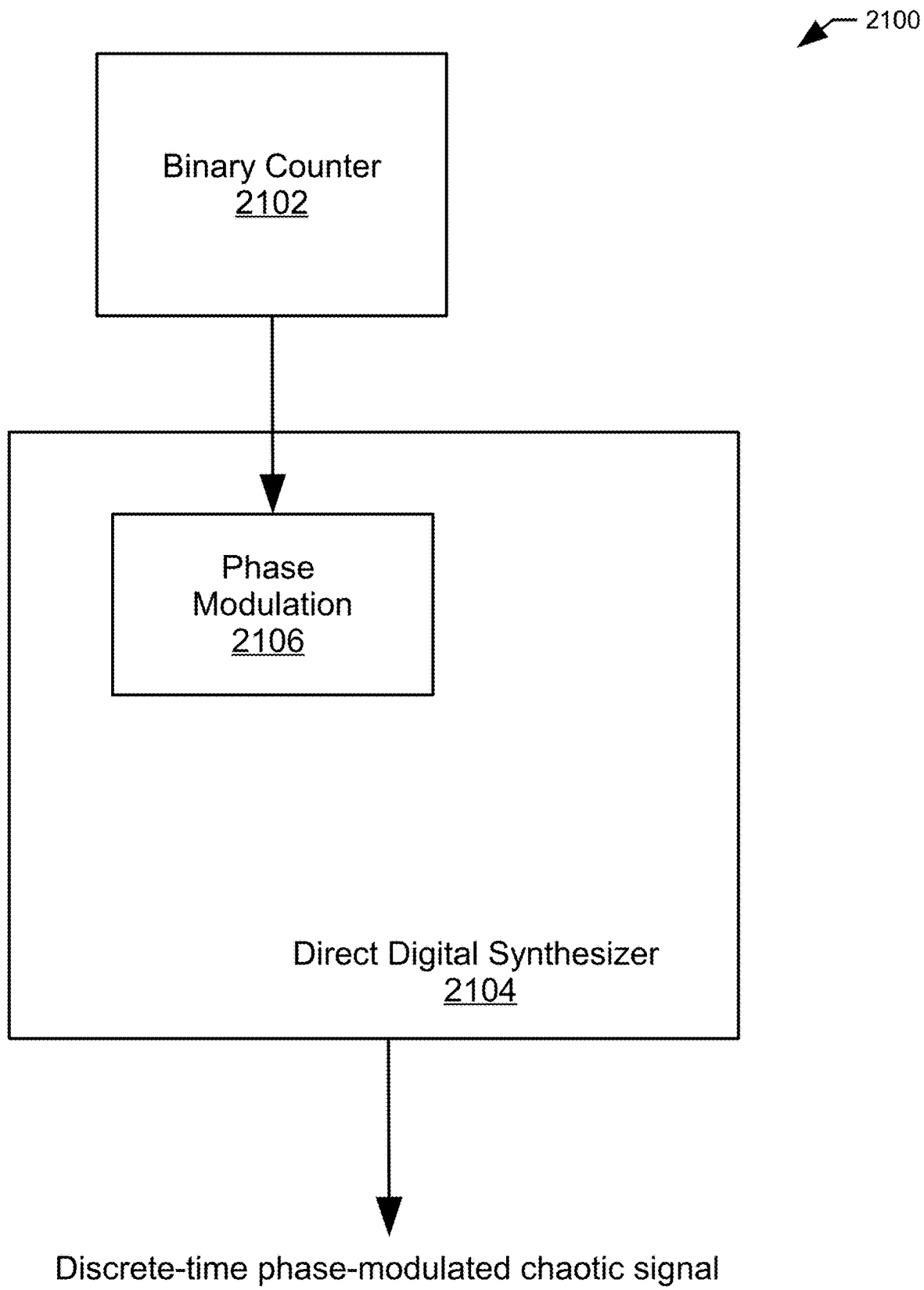
FIG. 21 illustrates a block diagram that depicts a system for generating a discrete-time phase-modulated chaotic sequence in accordance with an embodiment.

FIG. 21 presents a block diagram that depicts a system 2100 for generating a discrete-time phase-modulated chaotic sequence in accordance with an embodiment. In some embodiments, a binary counter 2102 of appropriate word width is used to generate a progressively increasing integer value as an input to a phase modulation block 2106 of a direct digital synthesizer 2104. This configuration can generate a discrete-time phase-modulated chaotic sequence. For a word width of N associated with the binary counter 2102, the binary counter 2102, starting at zero, resets after it reaches a count of $2^N-1$; however since the binary counter output is now the argument of a sine and/or cosine function, the phase of the sine and/or cosine functions at the time the binary counter resets may not be the same as that at the beginning of the previous counter cycle. Due to this phenomenon, it is possible that the discrete-time phase-modulated chaotic waveform generated during a new cycle may be entirely different from the discrete-time phase-modulated chaotic waveform generated during a previous cycle. The phenomenon of the phase in the sine and/or cosine functions thus may enable a chaotic sequence of a longer temporal length to be generated without repetition. The use of the direct digital synthesizer 2104 allows for discrete-time chaotic sequences to be generated at high rates in fixed-point format. This technique can be used in conjunction with all the chaotic modulation and generation schemes discussed above, including frequency-modulation and phase-modulation using chaotic sequences.

The binary counter 2102 may be configured to count up in ones, or the binary counter 2102 may be configured to count down in ones, thereby generating different chaotic sequences. Generalizing this concept, the increment (or decrement) in the binary counter is not limited to one; an increment or decrement of any integer value can be used, and this diversity generates an entire ensemble of chaotic sequences.

Figure 22:
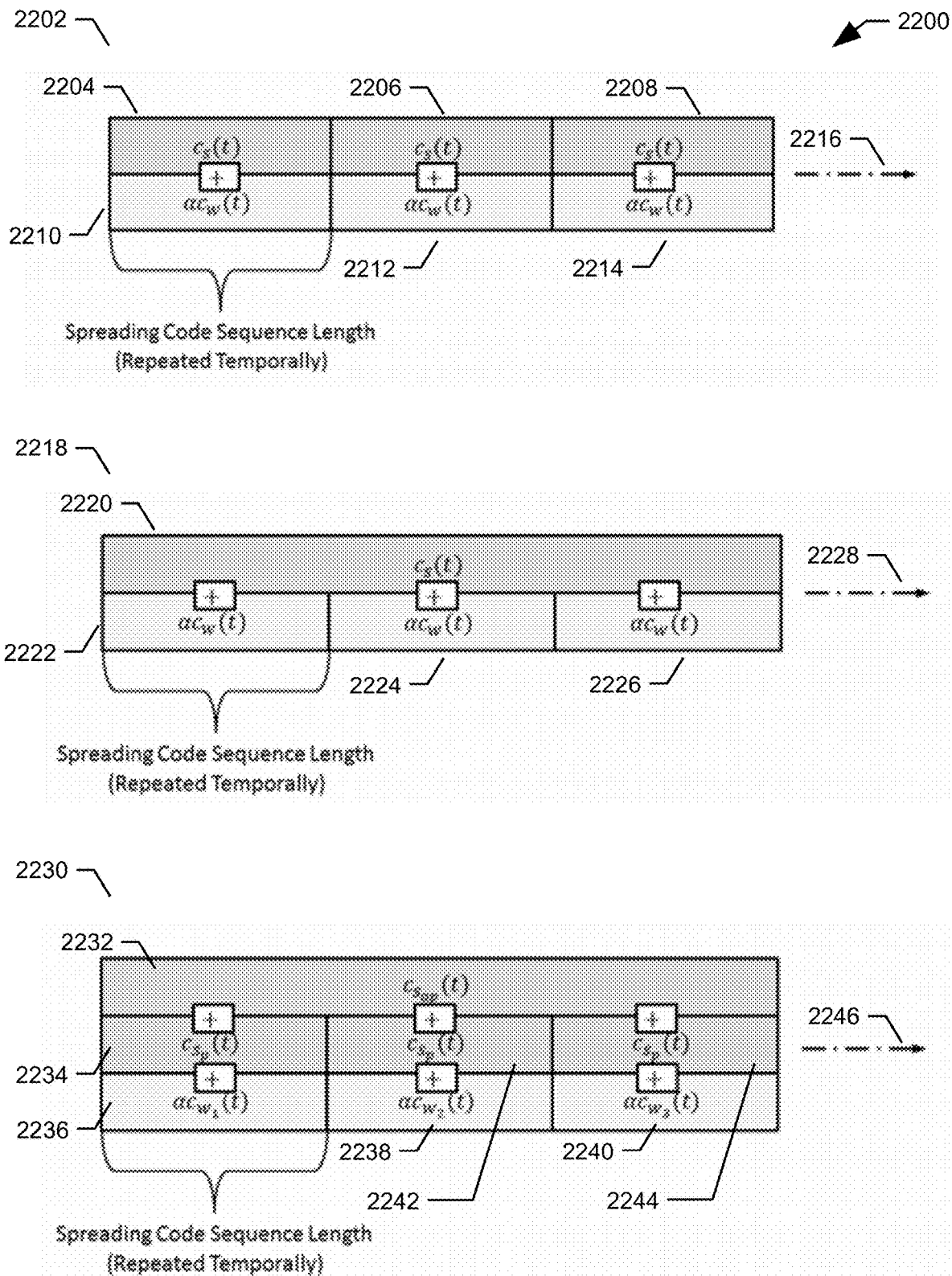
FIG. 22 illustrates a diagram illustrating different methods of masking information-carrying chaotic waveforms to increase the security of the communication system.

FIG. 22 presents a diagram illustrating different methods 2200 of masking information-carrying chaotic waveforms to increase the security of the communication system. Standard spread-spectrum systems oftentimes use periodically repeating waveforms to transmit information. If an adversary stores long lengths of a periodically repeated waveform, it may be possible for the adversary to auto-correlate the waveform and observe correlation peaks that are periodic. If a noise-only waveform is auto-correlated, the correlation function will show a correlation peak only at the initial sample. If, however, a noise-plus-spreading sequence waveform is auto-correlated and the spreading sequence is repeated, it may be possible to recover multiple, smaller periodic correlation peaks that are visible on the correlation plot. These periodic correlation peaks correspond to the spreading sequences, and give away the presence of the spread spectrum signal, even if the spread spectrum signal is buried below the noise floor. Now, the adversary can store this waveform and use it to intercept future communications that use the same waveform. While this process is difficult, this example shows that it is possible to hack into spread spectrum communication waveforms.

FIG. 22 presents multiple ways in which the robustness of spread spectrum systems using chaotic waveforms can be improved. In some embodiments, a composite chaotic waveform 2202 is comprised of two chaotic spreading sequences, a strong chaotic spreading sequence $c_s(t)$ 2204, and a weak chaotic spreading sequence $c_w(t)$ 2210, where the subscript "s" is used to denote a strong chaotic spreading sequence that has a power level that is greater than the weak chaotic spreading sequence denoted by subscript "w." The combination of the strong chaotic spreading sequence $c_s(t)$ 2204 and the weak chaotic spreading sequence $c_w(t)$ 2210 is repeated periodically 2216, as shown by 2206 and 2212, and 2208 and 2214 respectively. Of the strong chaotic spreading sequence $c_s(t)$ 2204, and the weak chaotic spreading sequence $c_w(t)$ 2210, only the weak chaotic spreading sequence $c_w(t)$ 2210 carries any communication information. The strong chaotic spreading sequence $c_s(t)$ 2204, and the weak chaotic spreading sequence $c_w(t)$ 2210 are of equal temporal length, and have their power levels adjusted such that the weak chaotic spreading sequence $c_w(t)$ 2210 can be recovered via a matched filter correlation operation at the receiver. In some embodiments, the weak chaotic spreading sequence $c_w(t)$ 2210 is scaled down by scaling factor $\alpha$. The strong communication signal $c_s(t)$ 2204 acts as a smokescreen or a synthetic noise floor that serves to mask the weak communication signal $c_w(t)$. The receiver has knowledge of both the strong chaotic spreading sequence $c_s(t)$ 2204 and the weak chaotic spreading sequence $c_w(t)$ 2210, and can recover the communication information contained in the weak chaotic spreading sequence $c_w(t)$ 2210. If an adversary intercepts this signal and attempts to perform an auto-correlation operation on this signal, the adversary will observe strong correlation peaks associated with the strong chaotic spreading sequence $c_s(t)$ 2204; the correlation peaks associated with the weak chaotic spreading sequence $c_w(t)$ 2210 will be masked by the strong correlation peaks of the strong chaotic spreading sequence $c_s(t)$ 2204. Thus, even by storing a length of the communication sequence, an adversary cannot recover the information content in the communication signal.

In other embodiments, a composite chaotic communication waveform 2218 is constructed similar to the composite chaotic communication waveform 2202, with the periodic strong chaotic spreading sequence $c_s(t)$ 2204 being replaced by an aperiodic strong chaotic spreading sequence $c_s(t)$ 2220. In some embodiments, aperiodic strong chaotic spreading sequence $c_s(t)$ 2220 is a chaotic sequence that has a temporal length that is much greater than the length of the weak chaotic spreading sequence $c_w(t)$ 2222, where the weak chaotic spreading sequence $c_w(t)$ 2222 carries communication information and is periodically repeated 2228 at 2224, 2226 and so on. Here, the aperiodic strong chaotic spreading sequence $c_s(t)$ 2220 serves as a synthetic noise floor to bury and hide the weak chaotic spreading sequence $c_w(t)$ 2222, with the power level of the aperiodic strong chaotic spreading sequence $c_s(t)$ 2220 being greater than the power level of the weak chaotic spreading sequence $c_w(t)$ 2222. In some embodiments, the weak chaotic spreading sequence $c_w(t)$ 2222 is scaled down by scaling factor $\alpha$ and is combined with the strong chaotic sequence $c_s(t)$ 2220.

In still other embodiments, a three-level chaotic signal structure is used to construct a composite chaotic communication waveform 2230. The composite chaotic communication waveform 2230 comprises a weak chaotic spreading sequence $c_w(t)$ 2236, appropriately scaled down by a factor of $\alpha$, combined with a periodic strong chaotic spreading sequence $c_{sp}(t)$ 2234 of temporal length equal to that of the weak chaotic spreading sequence $c_w(t)$ 2236, and an aperiodic strong chaotic spreading sequence $c_{sa}(t)$ 2232. The weak chaotic spreading sequence $c_w(t)$ 2236 and the periodic strong chaotic spreading sequence $c_{sp}(t)$ 2234 are temporally repeated 2246 at 2238 and 2242, 2240 and 2244, and so on, while the aperiodic strong chaotic spreading sequence $c_{sa}(t)$ 2232 has a temporal length that is much greater than the period of the weak chaotic spreading sequence $c_w(t)$ 2236. The combination of the aperiodic strong chaotic spreading sequence $c_{sa}(t)$ 2232 and the periodic strong chaotic spreading sequence $c_{sp}(t)$ 2234 together serve to mask the weak chaotic spreading sequence $c_w(t)$ 2236.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   generating, by a processing system, a phase angle and a trigonometric multiplier, wherein the phase angle and the trigonometric multiplier are associated with a chaotic sequence;
   generating, by the processing system using the phase angle and a trigonometric function, a sample of the chaotic sequence; and
   updating, by the processing system, using the trigonometric multiplier, the phase angle, to generate an updated phase angle.

2. The method of claim 1, further comprising determining, by the processing system, whether the updated phase angle is within a specified numerical range.

3. The method of claim 2, further comprising modifying, by the processing system, responsive to determining that the updated phase angle is not within the specified numerical range, the updated phase angle, wherein the modification results in the updated phase angle being within the specified numerical range.

4. The method of claim 2, wherein the specified numerical range is between −180° and 180°.

5. The method of claim 1, wherein the processing system includes a CORDIC block that is configured to process the phase angle and the trigonometric multiplier and generate the sample of the chaotic sequence.

6. The method of claim 1, wherein the trigonometric function is a cosine function.

7. The method of claim 1, wherein the trigonometric multiplier is an integer.

8. The method of claim 7, wherein the trigonometric multiplier is an odd integer.

9. The method of claim 1 wherein the processing system performs computations in a floating-point format.

10. The method of claim 1, wherein the processing system performs computations in a fixed-point format.

11. The method of claim 10, wherein the fixed-point format is a FixN_Q format.

12. An apparatus comprising:
    a direct digital synthesizer configured to generate a discrete-time sinusoidal signal, wherein the direct digital synthesizer is configured to receive one or more inputs that are used to program a phase and a frequency of the sinusoidal signal; and
    a discrete-time chaos waveform generator that is configured to generate a discrete-time chaotic signal, wherein the discrete-time chaos waveform generator is a binary counter, wherein the discrete-time chaotic signal is input to the direct digital synthesizer, and wherein the discrete-time chaotic signal is used to program the phase or the frequency of the sinusoidal signal.

13. A method comprising:
    generating a first chaotic sequence at a first power level;
    modulating the first chaotic sequence with communication information;
    generating a second chaotic sequence at a second power level, wherein the second power level is greater than the first power level;

combining the modulated first chaotic sequence and the second chaotic sequence to generate a composite chaotic sequence; and transmitting the composite chaotic sequence to a destination.

14. The method of claim 13, wherein the combination is an addition operation.

15. The method of claim 13, wherein the composite chaotic sequence includes a third chaotic sequence, wherein the third chaotic sequence is combined with the first chaotic sequence and the second chaotic sequence, wherein the third chaotic sequence is generated at a third power level, and wherein the third power level is greater than the first power level.

16. The method of claim 13, wherein the second chaotic sequence serves to mask the first chaotic sequence.

17. The method of claim 13, wherein the second chaotic sequence is repeated periodically.

18. The method of claim 13, wherein the second chaotic sequence is aperiodic.

* * * * *